(12) United States Patent
Fan et al.

(10) Patent No.: US 10,768,150 B2
(45) Date of Patent: Sep. 8, 2020

(54) MULTI-CHANNEL MULTI-DIMENSIONAL COMPREHENSIVE GAS CHROMATOGRAPHY

(71) Applicant: THE REGENTS OF THE UNIVERSITY OF MICHIGAN, Ann Arbor, MI (US)

(72) Inventors: Xudong Fan, Saline, MI (US); Jiwon Lee, Ann Arbor, MI (US); Menglian Zhou, Ypsilanti, MI (US); Hongbo Zhu, Ann Arbor, MI (US); Katsuo Kurabayashi, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 144 days.

(21) Appl. No.: 15/724,665

(22) Filed: Oct. 4, 2017

(65) Prior Publication Data
US 2018/0095060 A1     Apr. 5, 2018

Related U.S. Application Data

(60) Provisional application No. 62/403,830, filed on Oct. 4, 2016.

(51) Int. Cl.
G01N 30/46     (2006.01)
G01N 30/02     (2006.01)

(52) U.S. Cl.
CPC ......... *G01N 30/463* (2013.01); *G01N 30/465* (2013.01); *G01N 30/468* (2013.01); *G01N 30/466* (2013.01); *G01N 2030/025* (2013.01)

(58) Field of Classification Search
CPC .................................................. G01N 30/463
See application file for complete search history.

(56) References Cited

U.S. PATENT DOCUMENTS 5,135,549 A    8/1992 Phillips et al.
5,196,039 A    3/1993 Phillips et al.
(Continued)

FOREIGN PATENT DOCUMENTS

EP         1178309 A1      2/2002
KR    20030067220 A       8/2003
(Continued)

OTHER PUBLICATIONS

International Search Report and Written Opinion for PCT/US2017/055112, dated May 23, 2018; ISA/KR.
(Continued)

*Primary Examiner* — Lisa M Caputo
*Assistant Examiner* — Alex T Devito
(74) *Attorney, Agent, or Firm* — Harness, Dickey & Pierce, P.L.C.

(57) ABSTRACT

The present disclosure provides a method for conducting comprehensive chromatography analysis. Broadly, the method comprises separating a sample in a first chromatographic column to generate a primary stream, which is directed toward a non-modulator switching system comprising at least one micro-switch and at least one valve. The non-modulator switching system is continuously operated to: (a) selectively direct a portion of the primary stream to one of a plurality of thermal injectors and accumulating the portion of the primary stream for a predetermined amount of time; (b) inject the portion of the primary stream into one of a plurality of secondary chromatographic columns; (c) detect one or more analytes in a secondary stream exiting the secondary chromatographic column; and repeat (a)-(c) to selectively direct other portions of the primary stream to other thermal injectors and secondary chromatographic columns until all of the analytes in the sample are detected.

20 Claims, 11 Drawing Sheets

(56) References Cited

U.S. PATENT DOCUMENTS

| | | | | |
|---|---|---|---|---|
| 8,716,025 | B2* | 5/2014 | Witt | G01N 30/463 |
| | | | | 204/451 |
| 9,341,604 | B2 | 5/2016 | Fan et al. | |
| 2002/0020670 | A1 | 2/2002 | Petro | |
| 2003/0106363 | A1 | 6/2003 | Sacks et al. | |
| 2003/0118481 | A1 | 6/2003 | Briscoe et al. | |
| 2004/0232366 | A1* | 11/2004 | Seeley | G01N 30/20 |
| | | | | 251/12 |
| 2009/0150087 | A1 | 6/2009 | Steinecker | |
| 2009/0178563 | A1 | 7/2009 | Masel et al. | |
| 2009/0272270 | A1 | 11/2009 | McGill et al. | |
| 2010/0101411 | A1 | 4/2010 | Tipler | |
| 2010/0206045 | A1 | 8/2010 | Fisher | |
| 2011/0153225 | A1 | 6/2011 | Mangal et al. | |
| 2013/0126720 | A1 | 5/2013 | Lu et al. | |
| 2013/0169970 | A1 | 7/2013 | Fan et al. | |
| 2014/0017700 | A1 | 1/2014 | Fan et al. | |
| 2014/0298990 | A1 | 10/2014 | Fan et al. | |

FOREIGN PATENT DOCUMENTS

| | | |
|---|---|---|
| WO | 2005/024376 A2 | 3/2005 |
| WO | 2013/070954 A1 | 5/2013 |
| WO | 2016179291 A1 | 11/2016 |
| WO | WO-2018067686 A2 | 4/2018 |

OTHER PUBLICATIONS

Liu Jing, et al. Smart multi-channel two-dimensional micro-gas chromatography for rapid workplace hazardous volatile organic compounds measurement <http://www.ncbi.nlm.nih.gov/pubmed/23303462>. Lab Chip. Mar. 7, 2013;13 (5):818-25.

J. Lee et al., "In situ calibration of micro-photoionization detectors in a multi-dimensional micro-gas chromatography system," Analyst 141, 4100-4107 (2016).

Liu, Jing. Development of a Smart Multi-Channel Two-Dimensional Micro-Gas Chromatography. Deep Blue, University of Michigan MLibrary. 2012.

Hinshaw, John V., "Comprehensive Two-Dimensional Gas Chromatography," GC Connections, LCGC Europe, pp. 2-7 (Feb. 2004).

Hinshaw, John, "Gas Chromatography at the 26th International Symposium on Capillary Chromatography and Electophoresis," GC Connections, LCGC Europe, pp. 2-5 (Oct. 2003).

Liu, Jing, "Demonstration of a Two Dimensional Micro-Gas Chromatography System," Poster Session, 2012 Pittcon Conference & Expo, Session 850: GC Optimization (Mar. 12, 2012) (Abstract and p. 54 of Final Program).

Liu, Jing, et al., "Demonstration of motionless Knudsen pump based micro-gas chromatography featuring micro-fabricated columns and on-column detectors," Lab on a Chip, vol. 11, pp. 3487-3492 (Aug. 25, 2011) (downloaded on Jan. 9, 2012).

Liu, Jing, et al., "Fabry-Pérot Cavity Sensors for Multipoint On-Column Micro Gas Chromatography Detection," Anal. Chem., vol. 82, No. 11, pp. 4370-4375 (Jun. 1, 2010) (published online May 4, 2010).

Liu, Jing, et al., "Highly versatile fiber-based optical Fabry-Pérot gas sensor," Optics Express, vol. 17, No. 4, pp. 2731-2738 (Feb. 16, 2009) (published online Feb. 10, 2009).

Liu, Jing, et al., "Smart multi-channel two-dimensional micro-gas chromatography for rapid workplace hazardous volatile organic compounds measurement," Lab on a Chip, vol. 13, pp. 818-825, and Supplementary Information (7 pages) (2013).

Najafi, Khalil, "Micromachined Gas Chromatography Microsystem for Complex Gas Analysis," Presented at DARPA Microsystems Technology Symposium, San Jose, California (Mar. 7, 2007) (34 pages).

Reddy, Karthik, et al., "On-chip Fabry-Pérot interferometric sensors for micro-gas chromatography detection," Sensors and Actuators B: Chemical, vol. 159, pp. 60-65 (2011) (published online Jun. 15, 2011).

Reidy, Shaelah, et al., "A Microfabricated Comprehensive Two-Dimensional Gas Chromatography System," (Transducers) IEEE International Conference on Solid-State Sensors, Actuators, and Microsystems Workshop, Hilton Head Island, South Carolina, pp. 78-81 (Jun. 2010).

Shopova, Siyka I., et al., "On-Column Micro Gas Chromatography Detection with Capillary-Based Optical Ring Resonators," Anal. Chem., vol. 80, pp. 2232-2238 (2008) (published online Feb. 14, 2008).

International Search Report and Written Opinion for PCT/US2012/064207, dated Mar. 18, 2013; ISA/KR.

Extended European Search Report for European Patent Application No. 17859108.7 dated Apr. 2, 2020, 10 pages.

Tranchida, Peter Quinto et al., "Current-day employment of the micro-bore open-tubular capillary column in the gas chromatography field," Journal of Chromatography A, 1261 (2012), pp. 23-26; (Published online: Jun. 15, 2012) DOI: 10.1016/j.chroma.2012.05.074.

Dorman, Frank L. et al., "Gas Chromatography," Anal. Chem. 2010, 82, pp. 4775-4785; (Published online May 26, 2010) DOI: 10.1021/ac101156h.

* cited by examiner

|    | Analyte | $^1t_R$ | $^1$FWHM | $^2t_R$ | $^2$FWHM |    | Analyte | $^1t_R$ | $^1$FWHM | $^2t_R$ | $^2$FWHM |
|----|---------|---------|----------|---------|----------|----|---------|---------|----------|---------|----------|
| 1  | Hexane | 56 | 1.5 | 5.7 | 1 | 26 | Nonane | 310 | 10.9 | 18.4 | 1.4 |
| 2  | 2-methylfuran | 63 | 1 | 10.3 | 1 | 27 | 1,2-dichlorobenzene | 323 | 10.2 | 19.2 | 1.6 |
| 3  | Cyclohexane | 70 | 1.7 | 4 | 1.3 | 28 | Cumene | 331 | 9.2 | 18.4 | 1.22 |
| 4  | Benzene | 80 | 3.2 | 8 | 1.25 | 29 | 2-ethoxyethyl acetate | 333 | 7.2 | 24.7 | 1.2 |
| 5  | Heptane | 90 | 4 | 5.6 | 1 | 30 | Propylbenzene | 355 | 9.03 | 16 | 1.36 |
| 6  | 1,4-dioxane | 97 | 4.2 | 10 | 0.95 | 31 | (−)-α-pinene | 397 | 6.18 | 12 | 1.12 |
| 7  | Methylisobutylketone | 102 | 4.5 | 16 | 1.34 | 32 | 4-ethyltoluene | 396 | 5.2 | 11.9 | 1.4 |
| 8  | Methylcyclohexane | 102 | 4.6 | 5.57 | 1.23 | 33 | Benzaldehyde | 401 | 9 | 16 | 1.3 |
| 9  | Toluene | 144 | 6.91 | 8.8 | 1.12 | 34 | 2-chlorotoluene | 411 | 7.92 | 22.4 | 1.5 |
| 10 | Cyclopentanone | 156 | 5.99 | 11.1 | 1.34 | 35 | Mesitylene | 418 | 11.8 | 20 | 1.2 |
| 11 | 2-hexanone | 160 | 8.1 | 14 | 1.45 | 36 | 4-chlorotoluene | 419 | 6 | 16 | 1.4 |
| 12 | Hexanal | 168 | 8.8 | 12.8 | 1.12 | 37 | Phenol | 427 | 5.5 | 12 | 1.34 |
| 13 | Octane | 168 | 7.1 | 7.9 | 1.1 | 38 | 2-ethyltoluene | 500 | 10.3 | 19 | 1.31 |
| 14 | Trans-2-hexen-1-al | 202 | 10.7 | 12 | 1.23 | 39 | 1,3,4-trimethylbenzene | 508 | 7.2 | 22.4 | 1.6 |
| 15 | Chlorobenzene | 208 | 8.37 | 19.1 | 1.33 | 40 | 3-chlorotoluene | 511 | 5.5 | 15.2 | 1.5 |
| 16 | Ethylbenzene | 213 | 7.53 | 8.8 | 1.24 | 41 | 1,3-dichlorobenzene | 519 | 8.5 | 19.8 | 1.6 |
| 17 | Xylene | 221 | 5.36 | 12 | 1.34 | 42 | 1-heptanol | 522 | 8 | 21.6 | 1.29 |
| 18 | 1-hexanol | 228 | 4.1 | 15.3 | 1.09 | 43 | 2-octanone | 577 | 6 | 22.4 | 1.3 |
| 19 | Cyclohexanol | 236 | 8.7 | 17.5 | 1.2 | 44 | Decane | 581 | 8.3 | 12 | 1.8 |
| 20 | Styrene | 248 | 10.8 | 13.6 | 1.17 | 45 | (R)-(+)-limonene | 646 | 9.45 | 15.2 | 1 |
| 21 | Cyclohexanone | 250 | 11 | 12 | 1.3 | 46 | 3-octanol | 650 | 7 | 21.6 | 1.36 |
| 22 | 2-heptanone | 260 | 6.7 | 20 | 1.14 | 47 | Nonanal | 749 | 12.3 | 21.5 | 1.36 |
| 23 | Anisol | 264 | 11 | 22.3 | 1.2 | 48 | Undecane | 752 | 11 | 16 | 1.6 |
| 24 | Heptanal | 300 | 10 | 12.7 | 1.34 | 49 | 1-octen-3-ol | 805 | 10.5 | 20 | 1.81 |
| 25 | 2,5-hexadione | 305 | 11.4 | 16.8 | 1.8 | 50 | Dodecane | 812 | 11 | 16 | 1.57 |

Figure 11

|     | Analyte | $^1t_R$ | $^1$FWHM | $^2$FWHM | $n_{GC\times GC}$ | $n_{GC\times GC}/^1t_R$ |
|-----|---------|---------|----------|----------|-------------------|--------------------------|
| #29 | 2-ethoxyethyl acetate | 333 s | 7.2 s | 1.2 s | 430 | 77/min |
| #33 | Benzaldehyde | 401 s | 9 s | 1.1 s | 455 | 68/min |
| #50 | Dodecane | 812 s | 11 s | 1.57 s | 526 | 40/min |

Figure 12

MULTI-CHANNEL MULTI-DIMENSIONAL COMPREHENSIVE GAS CHROMATOGRAPHY

CROSS-REFERENCE TO RELATED APPLICATIONS

This application claims the benefit of U.S. Provisional Application No. 62/403,830, filed on Oct. 4, 2016. The entire disclosure of the above application is incorporated herein by reference in its entirety.

GOVERNMENT RIGHTS

This invention is made with government support under 83564401 awarded by the Environmental Protection Agency. The government has certain rights in the invention.

FIELD

The present disclosure relates to methods of conducting multi-channel multi-dimensional comprehensive gas chromatography, especially multi-channel multi-dimensional comprehensive gas chromatography micro-gas chromatography.

BACKGROUND

This section provides background information related to the present disclosure which is not necessarily prior art.

Gas chromatography (GC) is widely used in many industries to separate and identify target analytes, such as volatile organic compounds or semi-volatile organic compounds. GC is particularly useful for analyzing complex samples having multiple target analytes that require individual detection. GC works by observing "peaks" of chemicals passing through a separation column. Thus, a sample having different chemicals or target analytes is introduced via an injector into a packed bed column. Different portions of the sample pass through the column at different rates (due to each chemical's physical and chemical interactions with the material contained in the column). As the target analytes are eluted from (exit) the column, the detector can differentiate the species eluted over time based on the rate at which the analytes pass through the column. Such analytes can be electronically identified and/or quantified during or after the detection.

Micro-gas chromatography is conducted on a miniaturized scale from traditional gas chromatography. One specific type of micro-gas chromatography is comprehensive two-dimensional (2-D) gas chromatography ("GC×GC"). Comprehensive two-dimensional gas chromatography (GC×GC) is well-suited to analysis and separation of complex mixtures of volatile and/or semi-volatile compounds. Generally, GC×GC or comprehensive two-dimensional gas chromatography utilizes two columns of differing selectivities connected in series by a modulator device. In a conventional two-dimensional (2-D) comprehensive gas chromatography (GC) system, the modulator device is placed between the first ($1^{st}$) and second ($2^{nd}$) dimensional columns. The modulator device thus sends slices of eluent from the $1^{st}$ column to the $2^{nd}$ column, continuously trapping, focus, and re-injecting components eluted from the first column into the second column (as a continuous injector for the second column). The modulator cuts the eluents from the $1^{st}$ dimension ($^1D$) column periodically (modulation period ($P_M$): about 1-10 seconds) and then re-injects each sliced segment into the $2^{nd}$ dimension ($^2D$) column sequentially. Consequently, each analyte is subject to two independent separation processes, first by its vapor pressure in the $^1D$ column and then by its polarity in the $^2D$ column. A 2-D chromatogram consisting of the $^1D$ and $^2D$ retention times can be reconstructed by analyzing the eluted peaks detected by a vapor detector installed at the end of the $^2D$ column. Peak capacity is a characteristic of GC systems that describes an overall quantity of peaks that elute—corresponding to the number of discernable chemicals—that can be separated out from a sample by the system. A total peak capacity of GC×GC is $n_{GC \times GC} = n_1 \times n_2$, where $n_1$ and $n_2$ are the peak capacity for $^1D$ and $^2D$ separation, respectively. Thus, higher peak capacity is desirable in a GC system.

However, conventional 2-D comprehensive GC suffers from (1) lower peak capacity in the $1^{st}$ dimension due to the peak broadening during reconstruction caused by sampling; and (2) short $2^{nd}$ dimensional separation time (and hence lower peak capacity), which is limited by the modulation period (or sampling period). Accordingly, it would be desirable to solve these issues to improve 2-D comprehensive gas chromatography.

SUMMARY

This section provides a general summary of the disclosure, and is not a comprehensive disclosure of its full scope or all of its features.

In certain aspects, the present disclosure provides a method for conducting comprehensive chromatography analysis that comprises separating a sample in a primary chromatographic column to generate a primary stream. The primary stream is directed toward a non-modulator switching system. The non-modulator switching system comprises at least one micro-switch and at least one valve. The method further comprises continuously operating the non-modulator switching system to selectively direct the primary stream to a plurality of thermal injectors and a plurality of secondary chromatographic columns. Each of the plurality of thermal injectors is provided in parallel with one another and is in fluid communication with a respective secondary chromatographic column of the plurality. Continuously operating comprises (a) selectively directing a portion of the primary stream to one of the plurality of thermal injectors and accumulating the portion of the primary stream for a predetermined amount of time. Continuously operating further comprises (b) injecting the portion of the primary stream into one of the plurality of secondary chromatographic columns in fluid communication with the one of the plurality of thermal injectors. Continuously operating also comprises (c) detecting one or more target analytes in a secondary stream exiting the one of the plurality of secondary chromatographic columns. Continuously operating includes repeating (a)-(c) to selectively direct other portions of the primary stream to other thermal injectors of the plurality of thermal injectors and the plurality of secondary chromatographic columns in fluid communication therewith until all of the target analytes in the sample are detected after exiting the plurality of secondary chromatographic columns, thereby providing a comprehensive analysis of the sample.

In other aspects, the present disclosure provides a method for conducting comprehensive chromatography analysis. The method comprises receiving a primary stream of a sample at a non-modulator switching system. The non-modulator switching system comprises at least one micro-switch and at least one valve. The method further includes continuously operating the non-modulator switching system to selectively direct the primary stream to a plurality of thermal injectors and a plurality of chromatographic columns. Each of the plurality of thermal injectors is provided in parallel with one another. Each of the plurality of thermal injectors is in fluid communication with a respective chromatographic column of the plurality. The continuously operating comprises (a) selectively directing a portion of the primary stream to one of the plurality of thermal injectors and accumulating the portion of the primary stream for a predetermined amount of time. The selectively operating further comprises (b) injecting the portion of the primary stream into one of the plurality of chromatographic columns in fluid communication with the one of the plurality of thermal injectors. The selectively operating further comprises (c) detecting one or more target analytes in a secondary stream exiting the one of the plurality of chromatographic columns. The selectively operating further comprises repeating (a)-(c) to selectively direct other portions of the primary stream to other thermal injectors of the plurality of thermal injectors and the plurality of chromatographic columns in fluid communication therewith until substantially all of the target analytes in the sample are detected after exiting the plurality of chromatographic columns to provide a comprehensive analysis of the sample.

In yet other aspects, the present disclosure provides a method of increasing a maximum separation time in a second dimension of a two-dimensional comprehensive chromatography analysis. The method comprises separating a sample in a primary chromatographic column. The method further comprises detecting one or more target analytes in a primary stream exiting the primary chromatographic column during or after the separating of the sample in the primary chromatographic column. The detecting one or more target analytes in the primary stream includes flowing the sample through a non-destructive on-column detector. The method further comprises directing the primary stream toward a non-modulator switching system. The non-modulator switching system comprises at least one micro-switch and at least one valve. The method further comprises continuously operating the non-modulator switching system to selectively direct the primary stream to a plurality of thermal injectors and a plurality of secondary chromatographic columns. Each thermal injector of the plurality of thermal injectors is provided in parallel with one another and is in fluid communication with a respective secondary chromatographic column of the plurality. The continuously operating includes (a) selectively directing a portion of the primary stream to one of the plurality of thermal injectors and accumulating the portion of the primary stream for a predetermined amount of time. The continuously operating further includes (b) injecting the portion of the primary stream into one of the plurality of secondary chromatographic columns in fluid communication with the one of the plurality of thermal injectors. The continuously operating further includes (c) detecting one or more target analytes in a secondary stream exiting the one of the plurality of secondary chromatographic columns. The continuously operating further includes repeating (a)-(c) to selectively direct other portions of the primary stream to other thermal injectors of the plurality of thermal injectors and the plurality of secondary chromatographic columns in fluid communication therewith until substantially all of the target analytes in the sample are detected after exiting the plurality of secondary chromatographic columns to provide a comprehensive analysis of the sample. The maximum separation time is a product of the predetermined amount of time and a quantity of secondary chromatographic columns in the plurality of secondary chromatographic columns.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a simplified exemplary schematic showing a conventional comprehensive two-dimensional micro-gas chromatography (GC×GC) device.

FIG. 2 shows schematics of an exemplary embodiment of a two-dimensional (2-D) micro-gas chromatography device prepared in accordance with certain aspects of the present teachings. A primary chromatographic column and a plurality of distinct secondary chromatographic columns are disposed in series and in fluid communication with one another. Each of the plurality of distinct secondary chromatographic columns is in parallel with one another. A non-modulator switching device comprises a flow regulating device (e.g., three-way valve) and a micro-Deans switch disposed between a first chromatographic column and the plurality of downstream second chromatographic columns.

FIGS. 3A-3C show a computer simulation of first dimension ($^1$D) reconstruction of peaks using an EMG model and the $^1$D chromatogram detected by the $^1$D detector. FIG. 3A shows a single peak. FIG. 3B shows two coeluted peaks. FIG. 3C shows three coeluted peaks.

FIGS. 4A-4B are related to a micro-preconcentrator/injector (μPI) that reaches 270° C. in 0.6 s and then keeps at 250° C. for 10 s. FIG. 4A shows a temperature response of the μPI. The inset shows the front and back side of the μPI packed with Carbopack™ B. At the back side, the heater and resistive temperature detector (RTD) are wire-bonded to a printed circuit board. FIG. 4B shows normalized toluene peak obtained with micro-photoionization detector (μPID) under the injection condition of FIG. 4A. The helium flow rate is 2 mL/min. FWHM=700 ms.

FIGS. 5A-5D show schematics of a 1×4 flow switching module that includes three micro-Deans switches (μDS) (a μDS picture is shown in the inset) and two 3-port valves. FIG. 5A shows that the analyte is routed from the $^1$D column to column 2A in $^2$D. FIG. 5B shows dimensions of the μDS. FIGS. 5C-5D show schematic diagrams of flow routing system comprising three μDSs and two 3-port valves as analytes are sent to a second secondary chromatographic column (2B) and a third secondary chromatographic column (2C).

FIGS. 6A-6B show photographs an automated portable 1×4-channel GC×GC device. A weight of the automated portable 1×4-channel GC×GC device is less than 5 kg. FIG. 6A shows an outside of the automated portable 1×4-channel GC×GC device. FIG. 6B shows an inside of the automated portable 1×4-channel GC×GC device.

FIGS. 7A-7D show various detected and reconstructed chromatograms for doublet and triplet systems. FIG. 7A shows a first dimension ($^1$D) chromatogram obtained with a primary detector (μPID 1) for a mixture of 3-chlorotoluene and 1,3-dichlorobenzene and reconstructed $^1$D chromatogram for 3-chlorotoluene and 1,3-dichlorobenzene. FIG. 7B shows a comparison of the reconstructed $^1$D chromatograms in FIG. 7A for 3-chlorotoluene and 1,3-dichlorobenzene and those obtained with μPID 1 when 3-chlorotoluene and 1,3-dichlorobenzene are injected individually. FIG. 7C shows $^1$D chromatogram obtained with μPID 1 for a mixture of heptane, 1,4-dioxane, and methylisobutylketone and reconstructed $^1$D chromatogram for heptane, 1,4-dioxane, and methylisobutylketone. FIG. 7D shows a comparison of the reconstructed $^1$D chromatograms in FIG. 7A for heptane, 1,4-dioxane, and methylisobutylketone and those obtained with μPID 1 when heptane, 1,4-dioxane, and methylisobutylketone are injected individually.

FIGS. 8A-8F show two-dimensional (2-D) and three-dimensional (3-D) contour plots using Eqs. (9) and (10). FIG. 8A is a 2-D plot of a singlet analyte. FIG. 8B is a 3-D plot of the singlet analytes. FIG. 8C is a 2-D plot of doublet analytes. FIG. 8D is a 3-D plot of the doublet analytes. FIG. 8E is a 2-D plot of triplet analytes. FIG. 8F is a 3-D plot of the triplet analytes.

FIG. 11 shows a table of 50 VOCs used in experiments, and their $^1$D and $^2$D retention time and peak width.

FIG. 12 shows a table calculating the peak capacity and peak capacity production of the portable 1×4-channel GC×GC device based on Eqs. (12) and (13).

Corresponding reference numerals indicate corresponding parts throughout the several views of the drawings.

DETAILED DESCRIPTION

Figure 1:
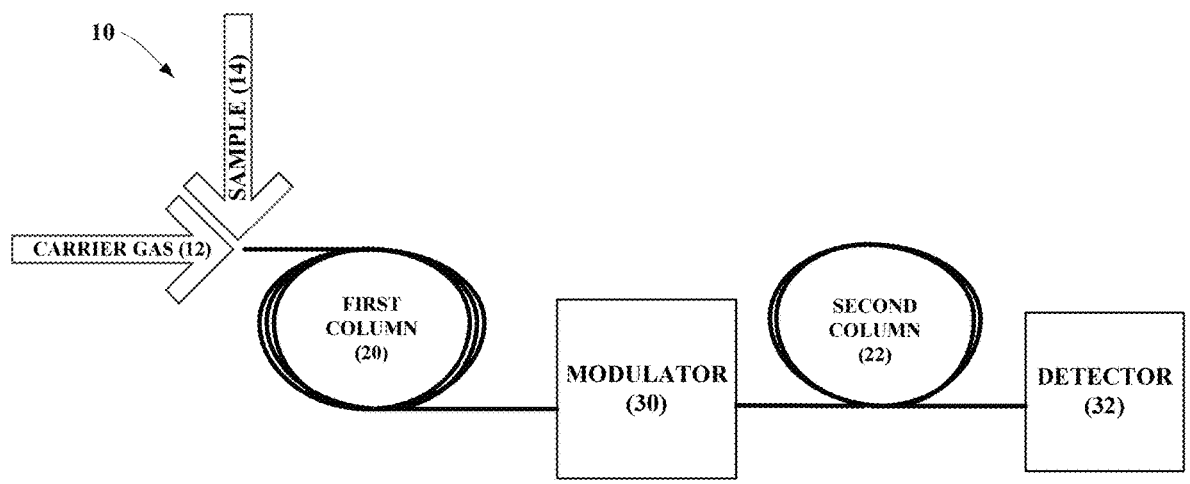

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

In various aspects, the present teachings pertain to gas chromatography analysis, more particularly to improved micro-gas chromatography devices and methods, such as improved methods of conducting two-dimensional comprehensive micro-gas chromatography. Gas chromatography systems typically have five components: (1) a carrier gas supply; (2) a sample injection system; (3) one or more gas chromatography columns; (4) a detector; and (5) a data processing system. A carrier gas (also referred to as a mobile phase) is a high-purity and relatively inert gas, such as helium, hydrogen, nitrogen, argon, or air. The carrier gas in a conventional system flows through the column at the same time as the sample fluid to be tested (throughout the separating process). The sample injector introduces a predetermined volume of the sample mixture comprising one or more target analytes to be tested (e.g., in gaseous form) into the column by combining it with the flowing carrier gas from a carrier gas supply. Typically, separation is achieved within a chromatographic column because the inside surfaces of a column are coated (or the interior of the column is filled) with a material that serves as a stationary phase. The stationary phase adsorbs different target analytes in the sample mixture at differing degrees. The differences in adsorption cause differing delays and thus mobility rates for the different chemical species as they travel down the column, thereby effecting a physical separation of the target analytes in the sample mixture.

In a conventional system, a single detector is located at the end of one or more columns. The detector thus serves to detect the various chemicals or target analytes in the sample emerging or eluting from the column at different times. Such a detector typically operates in the gas chromatography system by destructive analysis of the eluted fractions. A data processing system is also typically in communication with the detector, so as to typically be able to store, process, and record the separation test results.

With reference to FIG. 1, a conventional GC×GC (comprehensive two-dimensional gas chromatography) apparatus 10 is shown. A carrier gas supply 12 and a sample 14 (potentially having one or more target analytes) are introduced into a first chromatography column 20. The sample 14 moves through with co-injected carrier gas from carrier gas supply 12. The target analyte species from the sample 14 is separated and transported through first column 20 and thus eluted therefrom.

Thus, 2-D GC apparatus 10 comprises two distinct chromatography columns (designated primary first column 20 and a secondary second column 22) fluidly connected in series with a modulation component (modulator 30) disposed therebetween. Each chromatographic column 20, 22 is selected to have different selectivities for the one or more target analytes, usually by containing distinct stationary phases in each respective column. For example, the first column 20 may be non-polar, while the second column 22 is polar or semi-polar or vice versa. Usually, the second column 22 is shorter than and has a diameter that is less than the first column 20. Such a second column can thus operate at high speed and separates one injected fraction prior to commencing separation of the next fraction at the next injected interval (e.g., several seconds later). The use of the term "column" is intended to broadly include various flow paths through which fluids may flow, such as a patterned flow field from micro-features defined in one or more substrates or other fluid flow paths recognized by those of skill in the art.

It is noted that the eluted sample having one or more target analytes may be eluted from the first column 20 in partial fractions, depending on the delay of the respective target analyte species as they are passed through and separated by the first chromatographic column 20. Further, the sample fractions that elute from the first column 20 may be optionally trapped and re-injected downstream. In a conventional gas chromatography system, the components eluted from the primary first column 20 enter a detector for analysis after exiting the secondary second column 22.

In a 2-D GC apparatus 10, a modulator device 30 and second column 22 are disposed after and in fluid communication with the first column 20. After exiting the first column 20, portions of the eluted sample 14 are processed by a modulator device 30 (instead of being directly analyzed by detector), so that the eluted sample is introduced to second column 22 (having a distinct stationary phase from the primary column). Hence, a modulator device 30 is disposed between the first column 20 and the second column 22 and continuously collects and re-injects the components (the eluted sample) from the first chromatographic column 20 into the second chromatographic column 22.

One of the primary functions of a conventional modulator device 30 is to transform eluted peaks from the first column 20 into a series of narrow pulses or slices. A conventional modulator device may comprise a pneumatic modulator or a thermal modulator, for example. While simple and responsive, a pneumatic modulator lacks the re-focusing capability seen in a thermal modulator, thus resulting in peak broadening in the $^2$D separation and decreased detection sensitivity.

Thermal modulation is the most common type of modulator device 30 and operates by concentrating samples as they emerge from the first column 20 by collecting them in a retention region of the device. This retention is often done by rapid cooling of the gas stream for collection/retention, followed by rapid heating for desorption and release of the contents. The modulator device 30 thus serves as a continuous injector for the second column 22. In certain aspects, the modulator device 30 can sample effluent exiting the first column 20 and transfers it via a pulse to the second column 22. The transferring process occurs at predetermined repeating modulation intervals or periods. The modulator 30 usually collects the eluent from the first column 20 for a small fraction of the time, usually on the order of sub- to several seconds. Each fraction is re-focused into a very narrow band by the modulator device 30 and then sequentially injected into the second column 22 for additional separation. Because the modulator device 30 makes the separation at two columns independently, analytes can be differentiated from each other by their respective retention times at the first and second chromatographic columns 20, 22, thus providing two-dimensional separation information.

An exemplary micro-scale thermal modulator incorporates two series-coupled Pyrex-on-Si micro-channels coated with a thin layer (0.3 µm) polydimethylsiloxane (PDMS). It employs a thermoelectric cooler (TEC) to cryogenically trap the analytes eluted from the $^1$D column, and re-focuses and thermally injects them into the $^2$D column. The thermal modulator can be heated from −30° C. to about 210° C. at a rate of 2400° C./s, thus generating a peak as narrow as about 100 ms (full-width-at-half-maximum, FWHM). A hybrid GC×GC system is constructed using this micro-scale thermal modulator and the columns microfabricated on silicon wafers (6 m and 0.5 m long for the $^1$D and $^2$D, respectively), as well as macroscopic injector, flame ionization detector, and GC oven on a conventional bench-top GC, showing 2-D separation of 36 analytes in 22 minutes. However, this type of thermal modulator faces several challenges, such as thermal crosstalk that may affect the trapping efficiency, bleeding of the coating materials (currently PDMS) at high temperature (currently the highest temperature is 210° C.), and breakthrough of highly volatile compounds (such as benzene). Furthermore, constant cooling of the thermal modulator using a TEC requires a power of 20-40 W. Finally, its GC×GC architecture is still the same as for the regular bench-top GC×GC, thus inhering the same limitations commonly seen in all existing GC×GC systems, i.e., degraded $^1$D peak capacity due to peak broadening caused by modulation and insufficient $^2$D separation capability arising from short maximally-allowed $^2$D separation time imposed by the modulation period (e.g., 6 s).

Thus, typical thermal modulator devices, such as that shown in FIG. 1, collect the eluted sample species from the first column 20 and periodically inject the collected contents into the second column 22 at predetermined intervals (e.g., usually at intervals ranging from sub-seconds up to 5 seconds) while being constantly cooled. Such injected fractions are further separated in the second column 22 and eluted into a downstream detector 32 disposed after the second column 22. In typical operation, the sample fractions are quickly separated in the second column 22 and eluted into the detector 32, where they are identified and/or measured. The modulator device 30 typically controls the flow of analytes from the first column 20 to the second column 22, performing as a gate for injecting fractions in a consistent and reproducible fashion.

In a conventional system, a single detector like 32 can identify and optionally quantify the species eluted from the second chromatographic column 22, which is typically done by destructive analysis techniques. Typical detectors may be a mass spectrometer (MS) (e.g., a time-of-flight mass spectrometer (TOFMS)), a flame ionization detector (FID), an electron capture detector (ECD), or the like. The analytical detector device 32 in FIG. 1 is shown in a simplified version, so while not shown, such a system also has conventional heating elements, fluid flow regulators and conduits, and control electronics for sampling, heating, and acquisition of data, among other componentry. The analytical device can be associated with a data recording and processing unit (e.g., a computer or the like).

Multi-dimensional gas chromatography (GC×GC), such as that shown in FIG. 1, enables greater selectivity to improve the quality of separation of target analytes. In spite of its enhanced separation capability, the conventional 2-D µGC suffers from several drawbacks, such as a high modulation frequency, which consumes a considerable amount of power and high performance requirements for the modulator (e.g., 30) due to frequent operation, and complicated reconstruction of 2-D chromatogram, which requires extracting analytes' retention times at the first and second columns from limited and isolated information. The most significant limitation may be the short length of the second chromatographic column, as the second separation step must be completed within a modulation period (usually ranging from sub-second to a few seconds) in order to avoid the potential wrap-around issue. Consequently, the separation capability at the second column is severely degraded.

Conventional 2-D comprehensive GC thus suffers from (1) lower peak capacity in the $1^{st}$ dimension due to the peak broadening during reconstruction caused by sampling; and (2) short $2^{nd}$ dimensional separation time (and hence lower peak capacity), which is limited by the modulation period (or sampling period). Thus, various aspects of the inventive technology improve such conventional gas chromatography analytical devices by improving peak capacity while providing reduced processing times and comprehensive analysis of for all analytes in the sample.

In various aspects, the present disclosure provides methods for comprehensive chromatography, such as comprehensive multi-dimensional gas chromatography, which address these two issues by (1) adding multiple $2^{nd}$ dimensional columns; and (2) adding an on-column detector. The multiple second $2^{nd}$ dimensional columns enable the $1^{st}$ dimensional eluent to be sent sequentially to each of the $2^{nd}$ dimensional columns. Consequently, separation time on each column can be extended to a maximum separation time that is greater than a separation time in a convention system having a single $2^{nd}$ dimensional column. More specifically, the maximum separation time is less than or equal to a product of the quantity of $2^{nd}$ dimensional columns and the sampling period. Therefore, the peak capacity of the $2^{nd}$ columns is also increased. Adding an on-column detector enables the elution peaks from the $1^{st}$ column to be accurately reconstructed without a peak broadening issue. Consequently, the peak capacity in the $1^{st}$ column is increased. Further, a non-modulator switching device is used that reduces energy consumption as compared to conventional thermomodulators or pneumatic modulators. The increased separation time in the $2^{nd}$ dimensional columns reduces the frequency of operation of each thermal injector of the plurality, thereby allowing the thermal injectors to cool down slowly. Thus, in contrast to conventional modulators, the need for cooling mechanisms, such as TEC or liquid nitrogen, is reduced or eliminated and the non-modulator switching device may be operated at ambient temperature. By combining features (1) and (2) outlined above, the total peak capacity of the 2-D comprehensive GC (total peak capacity=$1^{st}$ dimension peak capacity multiplied by the $2^{nd}$ dimension peak capacity) significantly increases. By eliminating a conventional modulator with a non-modulator flow routing switching device as described herein, the system and methods described herein provide significant energy savings.

The present disclosure thus contemplates new methods of comprehensive chromatography analysis. Such methods may include separating a sample in a primary chromatographic column. Then a primary stream (e.g., a first stream) exiting the primary chromatographic column may be directed towards a non-modulator switching system. The non-modulator switching system comprises at least one micro-switch and at least one valve. The method further includes continuously operating the non-modulator switching system to selectively direct the primary stream exiting the primary column to a plurality of thermal injectors and a plurality of secondary chromatographic columns. Each of the plurality of thermal injectors is provided in parallel with one another and is in fluid communication with a respective secondary chromatographic column of the plurality of secondary chromatographic columns. The continuously operating may include: (a) selectively directing a portion of the primary stream to one of the plurality of thermal injectors and accumulating the portion of the primary stream for a predetermined amount of time (or sampling period); (b) injecting the portion of the primary stream into one of the plurality of secondary chromatographic columns in fluid communication with the thermal injector; (c) detecting one or more analytes in a secondary stream (e.g., a second stream) exiting the secondary chromatographic column; and repeating (a)-(c) to selectively direct other portions of the primary stream to other thermal injectors of the plurality of thermal injectors and the plurality of secondary chromatographic columns in fluid communication therewith until substantially all of the analytes in the sample are detected after exiting the plurality of second chromatographic columns to provide a comprehensive analysis of the sample. Thus, steps (a)-(c) may be conducted multiple times, including in multiple distinct thermal injectors and multiple secondary chromatographic columns.

In certain aspects, for example, the secondary stream comprises at least a first secondary stream and a second secondary stream. The continuously operating further comprises directing a first portion of the primary stream to a first thermal injector of the plurality of thermal injectors and accumulating the first portion of the primary stream for a predetermined amount of time, followed by injecting the first portion of the primary stream from the first thermal injector into a first secondary chromatographic column of the plurality of secondary chromatographic columns to form the first secondary stream. Then one or more analytes in the first secondary stream exiting the first secondary chromatographic column are detected. Next, a second portion of the primary stream is directed to a second thermal injector of the plurality of thermal injectors and accumulating the second portion of the primary stream for a predetermined amount of time, followed by injecting the second portion of the primary stream from the second thermal injector into a second secondary chromatographic column of the plurality of secondary chromatographic columns to create the second secondary stream, and detecting one or more analytes in the second secondary stream exiting the second secondary chromatographic column. These steps may be repeated until substantially all of the analytes in the sample are detected after exiting the plurality of secondary chromatographic columns In certain aspects, the method may further comprise detecting one or more analytes in the primary stream during or after the separating of the sample in the primary chromatographic column. The detecting of one or more target analytes may include flowing the sample through a non-destructive on-column detector. It is noted that by "on-column" it is meant that the detector is closely associated with the chromatographic column; for example, the detector may be disposed in, on, or near an exit of the chromatographic column, or alternatively disposed in near proximity to the chromatographic column, but downstream in a flow path through which the eluted sample fractions pass. A non-destructive detector may be associated with and detects passage of eluted materials from a primary chromatographic column. Furthermore, each chromatographic column present in the gas chromatography analytical device optionally comprises at least one detector disposed thereon or disposed after the column to monitor the contents of the respective columns. Thus, a first on-column vapor detector can non-destructively detect one or more analytes passing through/eluted from the first or primary GC column. A secondary GC separation column similarly may have a second detector disposed near its exit to detect one or more target analytes eluting therefrom. The first detector or sensor may be of the same type as the second terminal detector or sensor or, alternatively, the first detector may be of a different type than the second sensor/detector. In other variations, where a plurality of additional chromatographic columns is employed downstream from the first chromatographic column and the modulator component, each respective chromatographic column comprises a detector for detecting the eluted species therefrom. In certain aspects, suitable a non-destructive on-column detector is optionally selected from the group consisting of: a capillary based optical ring resonator (CBORR) device, a Fabry-Perot interferometer based sensor, a chemi-resistor sensor, a sound acoustic wave sensor, and a thermal conductivity sensor. In other aspects, a non-destructive on-column detector comprises a photoionization detector.

In certain variations, the detecting one or more target analytes in the primary stream generates a first output signal. The detecting one or more target analytes in the secondary stream generate a second output signal. The method further comprises reconstructing a first dimension elution peak for each analyte based on the first output signal, the second output signal, and the predetermined amount of time.

In certain variations, the one or more micro-switches of the non-modulator switching system comprise a micro-Deans switch. In other aspects, the non-modulator switching system and the plurality of thermal injectors are operated at ambient temperature. In still other aspects, the plurality of secondary chromatographic columns may comprise four chromatographic columns. A separation time in each secondary chromatographic column of the plurality of secondary chromatographic columns may be less than or equal to a product of the predetermined amount of time and a quantity of secondary chromatographic columns in the plurality of secondary chromatographic columns.

In certain other variations, the one or more micro-switches comprise a first micro-Deans switch, a second micro-Deans switch, and a third micro-Deans switch. The one or more valves comprise a first three-port valve and a second three-port valve. A first inlet of the first micro-Deans switch is in fluid communication with the primary stream. A second inlet and a third inlet of the first micro-Deans switch are in fluid communication with the first three-port valve. A first inlet of the second micro-Deans switch is in fluid communication with a first outlet of the first micro-Deans switch. A first inlet of the third micro-Deans switch is in fluid communication with a second outlet of the first micro-Deans switch. A second inlet and a third inlet of the second micro-Deans switch are in fluid communication with the second three-port valve. A second inlet and a third inlet of the third micro-Deans switch are in fluid communication with the second three-port valve. A first outlet of the second micro-Deans switch is in fluid communication with a first secondary chromatographic column. A second outlet of the second micro-Deans switch is in fluid communication with a second secondary chromatographic column. A first outlet of the third micro-Deans switch is in fluid communication with a third secondary chromatographic column. A second outlet of the third micro-Deans switch is in fluid communication with a fourth secondary chromatographic column.

In certain variations, the detecting one or more analytes in the secondary stream exiting the secondary chromatographic column includes flowing the sample through a non-destructive on-column detector. In certain aspects, the non-destructive on-column detector is selected from the group consisting of: a photoionization detector, a capillary based optical ring resonator (CBORR) device, a Fabry-Perot interferometer based sensor, a chemi-resistor sensor, a sound acoustic wave sensor, and a thermal conductivity sensor.

In certain variations, the detecting one or more analytes in the secondary stream exiting the secondary chromatographic column includes flowing the sample through a destructive on-column detector. In certain aspects, the destructive on-column detector is selected from the group consisting of: a mass spectrometer (MS), and a flame ionization detector (FID).

Another method of comprehensive gas chromatography according to certain aspects of the present disclosure comprises receiving a primary stream of a sample at a non-modulator switching system. The non-modulator switching system comprises at least one micro-switch and at least one valve. The method further includes continuously operating the non-modulator switching system to selectively direct the primary stream to a plurality of thermal injectors and a plurality of chromatographic columns. Each of the plurality of thermal injectors is provided in parallel with one another. Each of the plurality of thermal injectors is in fluid communication with a respective chromatographic column of the plurality. The continuously operating comprises (a) selectively directing a portion of the primary stream to one of the plurality of thermal injectors and accumulating the portion of the primary stream for a predetermined amount of time. The selectively operating further comprises (b) injecting the portion of the primary stream into one of the plurality of chromatographic columns in fluid communication with the thermal injector. The selectively operating further comprises (c) detecting one or more target analytes in a secondary stream exiting the chromatographic column. The selectively operating further comprises repeating (a)-(c) to selectively direct other portions of the primary stream to other thermal injectors of the plurality of thermal injectors and the plurality of chromatographic columns in fluid communication therewith until substantially all of the analytes in the sample are detected after exiting the plurality of chromatographic columns to provide a comprehensive analysis of the sample.

In certain other variations, the one or more micro-switches comprise a first micro-Deans switch, a second micro-Deans switch, and a third micro-Deans switch. The one or more valves comprise a first three-port valve and a second three-port valve. A first inlet of the first micro-Deans switch is in fluid communication with the primary stream. A second inlet and a third inlet of the first micro-Deans switch are in fluid communication with the first three-port valve. A first inlet of the second micro-Deans switch is in fluid communication with a first outlet of the first micro-Deans switch. A first inlet of the third micro-Deans switch is in fluid communication with a second outlet of the first micro-Deans switch. A second inlet and a third inlet of the second micro-Deans switch are in fluid communication with the second three-port valve. A second inlet and a third inlet of the third micro-Deans switch are in fluid communication with the second three-port valve. A first outlet of the second micro-Deans switch is in fluid communication with a first chromatographic column. A second outlet of the second micro-Deans switch is in fluid communication with a second chromatographic column. A first outlet of the third micro-Deans switch is in fluid communication with a third chromatographic column. A second outlet of the third micro-Deans switch is in fluid communication with a fourth chromatographic column.

In certain variations, the one or more micro-switches of the non-modulator switching system comprise a micro-Deans switch. In other aspects, the non-modulator switching system and the plurality of thermal injectors are operated at ambient temperature.

A method of increasing a maximum separation time in a second dimension of a two-dimensional comprehensive chromatography analysis according to certain aspects of the present disclosure comprises separating a sample in a primary chromatographic column. The method further comprises detecting one or more target analytes in a primary stream exiting the primary chromatographic column during or after the separating of the sample in the primary chromatographic column. The detecting one or more target analytes in the primary stream includes flowing the sample through a non-destructive on-column detector. The method further comprises directing the primary stream toward a non-modulator switching system. The non-modulator switching system comprises at least one micro-switch and at least one valve. The method further comprises continuously operating the non-modulator switching system to selectively direct the primary stream to a plurality of thermal injectors and a plurality of secondary chromatographic columns. Each thermal injector of the plurality of thermal injectors is provided in parallel with one another and is in fluid communication with a respective secondary chromatographic column of the plurality. The continuously operating includes (a) selectively directing a portion of the primary stream to one of the plurality of thermal injectors and accumulating the portion of the primary stream for a predetermined amount of time. The continuously operating further includes (b) injecting the portion of the primary stream into one of the plurality of secondary chromatographic columns in fluid communication with the thermal injector. The continuously operating further includes (c) detecting one or more target analytes in a secondary stream exiting the secondary chromatographic column. The continuously operating further includes repeating (a)-(c) to selectively direct other portions of the primary stream to other thermal injectors of the plurality of thermal injectors and the plurality of secondary chromatographic columns in fluid communication therewith until substantially all of the analytes in the sample are detected after exiting the plurality of secondary chromatographic columns to provide a comprehensive analysis of the sample. The maximum separation time is a product of the predetermined amount of time and a quantity of secondary chromatographic columns in the plurality of secondary chromatographic columns. In certain variations, the quantity of secondary chromatographic columns in the plurality of secondary chromatographic columns is four.

A suitable micro-gas chromatography (µGC) analytical device is a two dimensional (2-D) µGC that comprises at least two distinct gas chromatographic columns. For example, such a micro-gas chromatography (µGC) analytical device integrates two GC columns with different selectivities (e.g., each column has a distinct coating), while also having at least one detector. In certain aspects, the 2-D GC analytical device includes a primary chromatographic column and a plurality of secondary chromatographic columns. The 2-D GC analytical device also includes a non-modulator switching system. The non-modulator switching system comprises at least one micro-switch and at least one valve or flow regulating device. The 2-D GC analytical device further includes at least one thermal injector disposed between the primary column and a secondary column. The 2-D GC analytical device may further comprise one or more pumps.

One exemplary gas chromatography 2-D system 100 that may be used to conduct such a method as described above is shown in FIG. 2. Such an exemplary GC system is a 1×4 configuration. Thus, a primary chromatographic column 120 ($^1$D column) and a plurality of distinct secondary chromatographic columns 130 ($^2$D columns) are disposed in series and in fluid communication with one another. The plurality of distinct secondary chromatographic columns 130 includes a first secondary chromatographic column 130A, a second secondary chromatographic column 130B, a third secondary chromatographic column 130C, and a fourth secondary chromatographic column 130D. Each of the plurality of distinct secondary chromatographic columns 130A, 130B, 130C, 130D is in parallel with one another.

The gas chromatography 2-D system 100 includes an upstream routing system that feeds samples and carrier gas to the primary chromatographic column 120. For example, a sample source, here a Tedlar bag 118 holding a sample with gas analytes is in fluid communication with a 2-port valve 122 that is in fluid communication with the primary chromatographic column 120. A carrier gas supply system includes a source of supply gas 124, a 3-port valve 126, a pump 127, and a micro-preconcentrator/injector (μPI) 128. The gas analytes from the sample source 118 may first be drawn by the pump 127 through the 2-port valve 122 into the μPI 128. Then, the μPI 128 may be heated to inject the analytes into the primary chromatographic column 120 ($^1$D column).

A plurality of distinct thermal injectors 132, which may be microthermal injectors (μTI), are disposed between the primary chromatographic column 120 and the downstream plurality of distinct secondary chromatographic columns 130. The plurality of distinct thermal injectors 132 includes a first thermal injector 132A, a second thermal injector 132B, a third thermal injector 132C, and a fourth thermal injector 132D. Thus, the first thermal injector 132A is associated with the downstream first secondary chromatographic column 130A, a second thermal injector 132B is associated with the downstream second secondary chromatographic column 130B, a third thermal injector 132C is associated with the downstream third secondary chromatographic column 130C, and a fourth thermal injector 132D is associated with the downstream fourth secondary chromatographic column 130D. It should be noted that additional secondary columns and thermal injectors may be included in the system, and four are merely representative.

After separation of the sample in the primary chromatographic column 120, the sample exits in a primary stream and is then directed towards the non-modulator switching system 112 that comprises at least one valve 114, shown as a three-way valve, and at least one micro-switch 116. An optional first or primary detector 110 (μPID 1) may be present downstream of the primary column 120 to detect the presence of one or more target analytes eluted from the primary column 120 (in the primary stream) and provides a corresponding output signal. The valve 114 is disposed between the primary column 120 and plurality of secondary columns 130 and functions to regulate or switch the fluid connection between the primary and respective secondary columns 120, 130. A plurality of secondary detectors (μPID 2) 140 is disposed after the plurality of secondary columns 130 for analyzing each respective secondary stream exiting the plurality of secondary columns 130 (e.g., first, second, third, and fourth secondary streams). The plurality of secondary detectors 140 includes a first secondary detector 140A, a second secondary detector 140B, a third secondary detector 140C, and a fourth secondary detector 140D. Thus, the first secondary detector 140A is disposed downstream of and in fluid communication with the first secondary chromatographic column 130A, the second secondary detector 140B is associated with the second secondary chromatographic column 130B, the third secondary detector 140C is associated with the third secondary chromatographic column 130C, and the fourth secondary detector 140D is associated with the fourth secondary chromatographic column 130D. Pumps (not shown) may be placed at the end of the secondary columns 130 to provide fluidic flow to the entire system. The on-column detectors (first and second sensors 110, 140) may be included in the system to monitor and/or record retention time of each analyte from the corresponding column. In certain variations, such an on-column detector can be an on-column column vapor detector, as discussed above. In certain variations, a detector may be an on-optical detector. In certain variations, a suitable on-column optical detector for the first detector is non-destructive and comprises a capillary based optical ring resonator (CBORR) device, a Fabry-Pérot detector, a chemi-resistor sensor, a sound acoustic wave sensor, or a thermal conductivity detector, as discussed previously above. While the primary and secondary detectors 110, 140 may be the same type of detector placed at different positions in the system, in other alternative variations, the first and second detectors may be different from one another. In addition to the non-destructive detectors described above, a second detector may be a destructive on-column detector such as a mass spectrometer (MS) (e.g., a time-of-flight mass spectrometer (TOFMS)), a flame ionization detector (FID), or other detectors known or to be discovered in the art.

The non-modulator switching system 112 comprises a three-way valve 114 and a micro-Deans switch 116 (downstream of the primary column 120 and optional primary detector 110 (Sensor 1)). Thus, the non-modulator switching system 112 serves to selectively direct a primary stream exiting the primary column 120 to the plurality of thermal injectors 132 and the plurality of secondary chromatographic columns 130. In certain variations, while not shown, a carrier gas may be supplied to the non-modulator switching system 112 to flow with the sample introduced into the plurality of secondary chromatographic columns. Each of the plurality of thermal injectors 132 is provided in parallel with one another and is in fluid communication with a respective secondary chromatographic column 130A, 130B, 130C, 130D.

The continuous operation of the non-modulator switching system 112 may include: (a) selectively directing a portion of the primary stream to one of the plurality of thermal injectors, for example, to the first thermal injector 132A and accumulating the first portion of the primary stream for a predetermined amount of time and (b) injecting the portion of the primary stream into one of the plurality of secondary chromatographic columns in fluid communication with the thermal injector 132A, for example, into the first secondary chromatographic column 130A. Then, (c) detecting one or more analytes from a first secondary stream exiting the first secondary chromatographic column 130A in the first secondary detector 140A. Steps (a)-(c) may be repeated to selectively direct other portions of the primary stream to other thermal injectors (one of 132B-132D) and the plurality of secondary chromatographic columns (a respective one of 130B-130D) in fluid communication therewith until substantially all of the analytes in the sample are detected (by respective secondary detectors 140B-140D) after exiting the plurality of secondary chromatographic columns 130 to provide a comprehensive analysis of the sample. More specifically, where the system 100 includes four secondary chromatographic columns 130A-130D as shown, the primary stream (e.g., a first stream) may be divided into the first secondary stream (e.g., a second stream), a second secondary stream (e.g., a third stream), a third secondary stream (e.g., a fourth stream), and a fourth secondary stream (e.g., a fifth stream). Thus, the first, second, third, and fourth secondary streams may be collectively referred to as "a secondary stream." The first, second, third, and fourth secondary streams flow through the first, second, third, and fourth secondary chromatographic columns 130A, 130B, 130C, 130D, respectively, and the first, second, third, and fourth secondary detectors 140A, 140B, 140C, 140D, respectively.

The thermal injector devices 132 trap and collect the eluted fractions from the primary chromatographic column 120. The thermal injector devices 132 thus re-focus the peak eluted out from the primary column 120 (collected fraction(s)) and re-inject the eluted sample into the secondary column 130, for example, by raising its temperature to a sufficient level.

Because the non-modulator switching system 112 continuously operates to regulate flow of the sample into a plurality of secondary downstream chromatographic columns 130, it provides comprehensive analysis of the entire sample exiting the primary column 120. However, by operating at ambient temperature, the non-modulator switching system avoids power consumption and extreme temperatures and pressures associated with conventional modulator assemblies, including a thermomodulator that requires not only heating, but cooling to low temperatures (e.g., −120° C.). In accordance with certain aspects of the present disclosure, effective flow routing and continuous operation occurs without a traditional energy consumptive modulator.

In certain aspects, the methods are particularly suitable for use in portable gas chromatography (GC) systems, which are used for a broad range of field applications such as environmental (e.g., air, water, and soil), chemical (e.g., explosive vapors, and chemical warfare agents), pharmaceutical or clinical (e.g., urine), and anthropogenic (e.g., indoor gas and operation) gas monitoring. However, current commercially available portable GC systems are simply the miniaturized version of the one-dimensional (1-D) benchtop GC. While field-deployable and rapid in vapor analysis, they suffer severely from deteriorated separation capability or peak capacity due primarily to the short column length, wide peak width resulting from miniaturization, and requirement for short analysis time. Therefore, they usually can separate only a small set or limited, well-defined class of vapors (such as gasoline, chlorinated alkenes, and diesel) and often fail when complex sample matrices are present.

As discussed above, comprehensive two-dimensional (2-D) GC (i.e., GC×GC) improves peak capacity over 1-D GC. In GC×GC, a long $1^{st}$-dimensional ($^1$D) column, usually coated with a non-polar stationary phase, is connected to a short $2^{nd}$ dimensional ($^2$D) column that is usually coated with a polar stationary phase. In certain aspects of the present disclosure, a fully automated portable comprehensive 2-D GC device is provided, that in certain variations, may have dimensions of about 60 cm×50 cm×10 cm and a weight of less than about 5 kg. A portable GC×GC device employs multiple channels in $^2$D to increase the maximum $^2$D separation time (up to 32 s) and hence the $^2$D peak capacity, and a non-destructive flow-through vapor detector installed at the end of the $^1$D column to monitor the $^1$D separation and assist in reconstructing $^1$D elution peaks. The entire device comprises a micro-preconcentrator/injector (μPI), a commercial column (which can be replaced with microfabricated columns), micro-Deans switch (μDS), micro-thermal injector (μTI), and micro-photoionization detector (μPID), as well as miniaturized valve, pump, helium cartridge, and power supply. A Labview™ based user interface and operation control are also implemented for automation. The details of the system operational principles are addressed herein, along with its advantages over the conventional GC×GC arrangement (i.e., 1×1-channel with a vapor detector installed only at the end of the $^2$D column). The approach and algorithm to reconstruct $^1$D elution peaks using the information obtained jointly by the $^1$D and $^2$D detectors are then discussed, followed by the description and characterization of each component. The 1D reconstruction algorithm is experimentally validated. Finally, 2-D separation of 50 analytes in 14 minutes is demonstrated. The peak capacity and the peak capacity production of this system are estimated to be 430-530 and 40-80/min, respectively, using three representative analytes.

Operational Principle of an Exemplary Multi-Channel GC×GC

Figure 2:
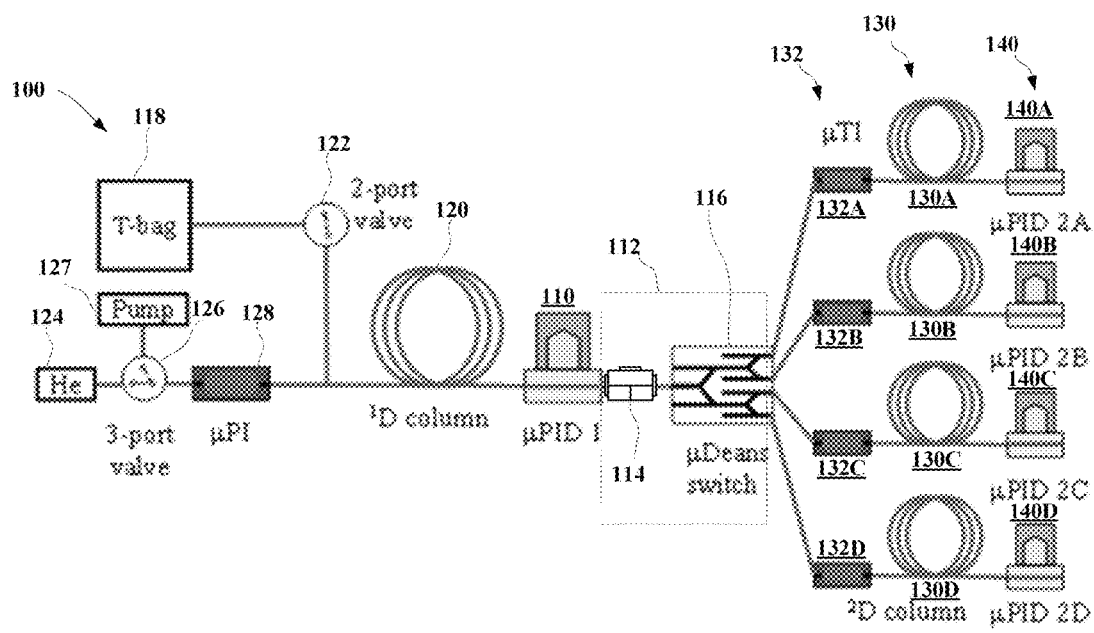

The general operation principle of the multi-channel GC×GC 100 is illustrated in FIG. 2, as discussed above. The analytes are first separated by the $^1$D column 120 and the elution is monitored by the non-destructive primary detector 110 installed at the end of the $^1$D column 120 without interrupting the flow. Notably, this initial primary detector 110 is optional, but helps to improve system operation. The non-modulator switching system module 112 is used to periodically send slices of eluents from the $^1$D column 120 to the multiple $^2$D columns 130A-130D sequentially. The eluents from the $^2$D columns 130A-130D are detected at the end of the columns by the secondary detectors 140A-140D. The $^1$D elution peaks can be reconstructed from the information obtained jointly by the primary and secondary detectors 110, 140 in the $^1$D column 120 and the $^2$D column 130 (discussed further in the context of the algorithm of reconstructing $^1$D peaks below). The exemplary 1×4-channel GC×GC arrangement 100 of in FIG. 2 has the following modules and operation processes.

(1) The sampling and injection module includes the Tedlar bag 118, the μPI 128, the pump 127, the 2-port valve 122, and the 3-port valve 126. The gas analytes from the Tedlar bag 118 are first drawn by the pump 127 through the 2-port valve 122 into the μPI 128. Then, the μPI 128 is heated to inject the analytes into the $^1$D column 120.

(2) The $^1$D separation and detection module includes the primary detector 110, which may be a home-built temperature programmable separation column and a vapor detector (μPID 1).

(3) The modulation and switching module includes the three μDSs 116 to sequentially send the eluent from the $^1$D column 120 into one of the four $^2$D columns 130, i.e., Column 130A, 130B, 130C, 130D, and then back to 130A, so on and so forth.

(4) The four identical $^2$D separation and detection modules include the μTI 132A-132D, the temperature programmable separation column 130A-130D, and the vapor detector (μPID) 140A-140D. During operation, a slice of the $^1$D eluent routed by the μDS 116 is trapped by the μTI 132 and then the μTI 132 is heated to inject the analyte into the $^2$D column (e.g., 130A) for separation. Meanwhile, the slices from the $^1$D eluent are routed to the remaining three $^2$D columns (e.g., 130B-130D) for separation. Therefore, the total separation time on each $^2$D column 130A-130D could be as long as four times the sampling period.

As compared to the conventional GC×GC, this GC×GC design has several advantages. First, in the conventional GC×GC, the $^2$D separation time is limited by the short modulation period (to avoid the wrap-around issue), thus resulting in the lower $^2$D peak capacity. In contrast, the multiple channel design 100 presented here allows for much longer separation time to significantly increase the $^2$D peak capacity. More specifically, the separation time may be less than or equal to a product of 2D columns and the sampling period. Thus, a method of increasing the maximum separation time in $^2$D compared to a separation time in a convention system having single channel $^2$D is provided. Second, in the conventional GC×GC, the $^1$D elution peaks are not detected directly. Rather, they are reconstructed using the modulation period and the information obtained by the detector at the end of the $^2$D column, which leads to deteriorated resolution (and hence lower $^1$D peak capacity). In contrast, the present GC×GC 100 with the primary detector (μPID) 110 can monitor the elution from the $^1$D column 120 so that the elution peaks in the $^1$D column 120 can be reconstructed more accurately, thus increasing the peak capacity in $^1$D. Thus, a method of reconstructing 1D elution peaks using an output from the primary detector 110 is provided. Third, in comparison with the micro-scale thermal modulator discussed previously, the modulation, focusing, and injection of analytes are accomplished by the μDS 116 and the μTI 132, which are mechanically robust and can be operated at room temperature without the need for a TEC. Neither coating bleeding nor analyte breakthrough occurs. Fourth, the present GC×GC system 100 is highly scalable by adding more μDSs, μTIs, μPIDs, and $^2$D columns. Finally, the GC×GC system 100 exhibits high versatility to operate in a heart-cutting mode (rather than the GC×GC mode) with minimal modifications (in control software).

Algorithm of Reconstructing $^1$D Peaks

While in theory GC×GC enhances the peak capacity, in practice the enhancement is significantly impaired due to the lack of $^1$D separation information. The retention times or peaks in $^1$D are deduced from the information obtained from $^2$D chromatograms. Several methods such as chemometrics have been explored, but the $^1$D reconstruction capability is still limited.

In various aspects, the present disclosure provides a method of reconstructing the $^1$D elution peaks based on an output generated by the primary detector 110, outputs generated by the secondary detectors 140, and a modulation time (e.g., predetermined amount of time). The method discussed below is merely exemplary and other methods may be employed to reconstruct the $^1$D elution peaks based on information from the first and second detectors, 110, 140 and the modulation period. Here a reconstruction method of $^1$D peaks is demonstrated using the exponentially modified Gaussian (EMG) model with the assist of the $^1$D chromatogram obtained with the primary detector (μPID 1) 110. The EMG function, which begins with a Gaussian distribution and ends with an exponential decay, is widely used to analyze peaks in chromatography. It can be defined as:

$$f(t; \mu, \sigma, \lambda) = \frac{\lambda}{2} \exp\left[\frac{\lambda}{2}(2\mu + \lambda\sigma^2 - 2t)\right] \cdot erfc\left(\frac{\mu + \lambda\sigma^2 - t}{\sqrt{2}\sigma}\right), \quad (1)$$

where t is the time, λ is the rate of an exponential decay, μ and σ and a are the mean and the standard deviation of a normal Gaussian function, respectively. erfc is the complementary error function and defined as:

$$erfc(x) = \frac{2}{\sqrt{\pi}} \int_x^\infty e^{-q^2} dq. \quad (2)$$

Note that the total area under the EMG function defined in Eq. (1) is normalized to unity. The retention time $t_m$, of the EMG is defined as:

$$t_m = \mu - \sqrt{2}\,\sigma \cdot erfcinv\left(\frac{\sqrt{2}}{\sqrt{\pi}\,|\lambda|\sigma}\right) + \lambda\sigma^2, \quad (3)$$

where erfcinv is the inverse function of erfc.

Assuming that an analyte from $^1$D is modulated to $^2$D n times at $t_1, t_2, t_3, \ldots, t_n$, the corresponding normalized peak area in $^2$D is $a_1, a_2, a_3, \ldots, a_n$ (i.e., $a_1+a_2+a_3+\ldots+a_n=1$). To find the best fit EMG curve for this analyte in $^1$D, an objective function is established. The objective function, e, is defined as follows:

$$e = \sum_{i=1}^{n} e_i^2, \quad (4)$$

$$e_i = a_i - \int_{t_{i-1}}^{t_i} f(t; \mu, \sigma, \lambda) \cdot dt \ (i = 1, 2, 3, \ldots, n). \quad (5)$$

Once the three parameters (β, σ, and λ) are provided, the normalized EMG function $f(t; \mu, \sigma, \lambda)$ is fully defined. To find μ, σ, and λ, it is further assumed that the retention time for the analyte is located between $t_0$ and $t_n$, i.e., $t_0 < t_m < t_n$, which allows scanning of $t_m$ within the range of $t_0$ to $t_n$ to find the optimal μ, σ, and λ. For a given $t_m$, there are only two independent parameters, σ and λ (μ can be determined by Eq. 3). Therefore, minimizing the objective function e in the σ-λ plane results in $e_{min}$, a set of (μ, σ, and λ), and hence the corresponding EMG function $f(t; \mu, \sigma, \lambda)$. Repeating the same procedures by scanning $t_m$ (i.e., $t_m^{(1)}, t_m^{(2)}, \ldots, t_m^{(p)}$, where p is the number of $t_m$s used in the scanning), a series of $e_{min}$ (i.e., $e_{min}^{(1)}, e_{min}^{(2)}, \ldots, e_{min}^{(p)}$) and the associated EMG functions, $f(t; \mu^{(1)}, \sigma^{(1)}, \lambda^{(1)})$, $f(t; \mu^{(2)}, \sigma^{(2)}, \lambda^{(2)})$, …, and $f(t; \mu^{(p)}, \sigma^{(p)}, \lambda^{(p)})$ are obtained.

In the traditional method that lacks of the primary detector 110, the best fit EMG function $f(t; \mu, \sigma, \lambda)$ is the one that corresponds to the lowest $e_{min}$. In contrast, with the information provided by the primary detector 110 in the present system 100 (i.e., an output from the primary detector 110), the EMG functions and hence the $^1$D peaks can be obtained with much higher accuracy and resolution. Assuming the $^1$D chromatogram obtained with the primary detector 110 is h(t) (i.e., the difference E between h(t) and $f(t; \mu, \sigma, \lambda)$ is given as:

$$E = \int_{t_0}^{t_n} |h(t) - A \cdot f(t; \mu, \sigma, \lambda)| \cdot dt \quad (6)$$

where A represents the total area of the $^2$D chromatograms. Eq. (6) is tested with the p EMG functions obtained previously and the best fit EMG (and the associated area, A) is the one that minimizes E. Note that here the singlet case is used (i.e., where there is only one analyte) in Eq. (6) to illustrate the algorithm for the sake of mathematical simplicity and completeness. In practice, if there is only one analyte, h(t) itself can be used to reconstruct the $^1$D peak. In the case of doublet (i.e., two coeluted analytes) and triplet (i.e., three coeluted analytes), Eq. (6) can be generalized as:

$$E=\int_{t_0}^{t_n}|h(t)-A_j\cdot f(t;\mu_j,\sigma_j,\lambda_j)-A_k\cdot f(t;\mu_k,\sigma_k,\lambda_k)|\cdot dt, \quad (7)$$

$$E=\int_{t_0}^{t_n}|h(t)-A_j\cdot f(t;\mu_j,\sigma_j,\lambda_j)-A_k\cdot f(t;\mu_k,\sigma_k,\lambda_k)-A_l\cdot f(t;\mu_l,\sigma_l,\lambda_l)|\cdot dt \quad (8)$$

where j, k, l=1, 2, 3, . . . , p for different coeluted analytes and $A_{j,k,l}$ are the corresponding total areas obtained from the $^2$D chromatograms (i.e., an output from the secondary detectors 140). By minimizing E, the best set of the EMG functions (along with the areas) for the coeluted analytes can be obtained.

Figures 3A, 3B, 3C:
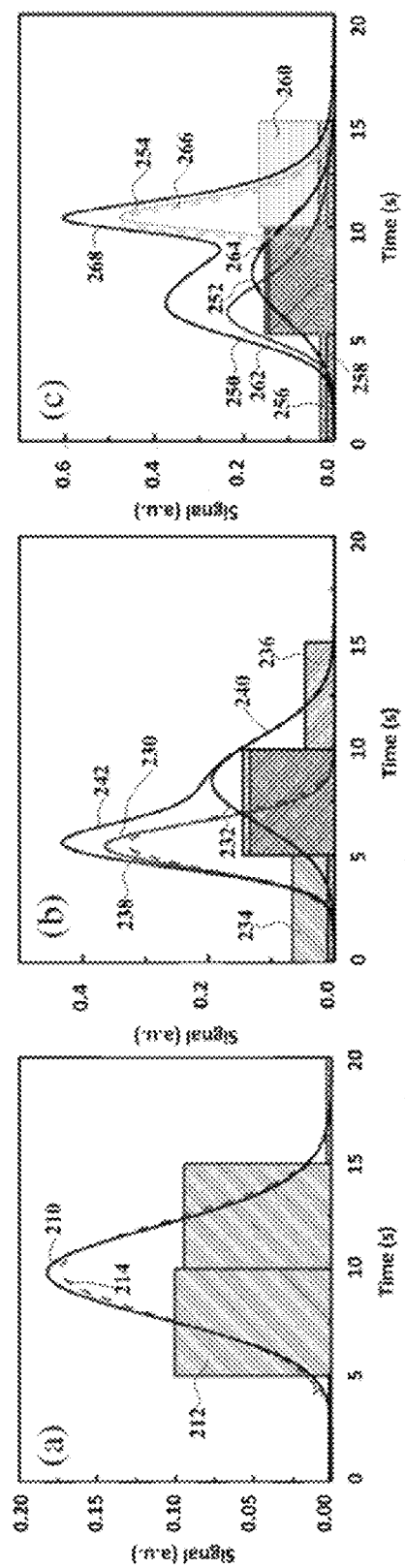

In FIGS. 3A-3C, the reconstruction of one, two, and three coeluted peaks (singlet, doublet, and triplet) using the above algorithm is simulated. Note, as previously discussed, in practice singlet peaks can be reconstructed directly by the signal from the primary detector in the present method. The singlet example presented in FIG. 3A is simply to show the ability of the algorithm that contrasts the deficiencies in the traditional method. Referring to FIG. 3A, a measured $^1$D peak is shown at 210 ($\mu$=9, $\sigma$=2, and $\lambda$=1). A peak area is represented by the bars at 212. A width of the bar 212 corresponds to the modulation period (i.e., 5 s in the present example) and the area represents a quantity of analyte in each modulation, as detected by the secondary detector. A reconstructed peak according to the method discussed above is shown at 214.

The doublet case in FIG. 3B is used to demonstrate the reconstruction procedures. First, the $^1$D peaks are generated with various combinations of $\mu$, $\sigma$, and $\lambda$ in Eq. (1). A generated peak for a first analyte ($\mu$=5, $\sigma$=1, and $\lambda$=2) is shown at 230 and a generated peak for a second analyte ($\mu$=7, $\sigma$=2, and $\lambda$=1) is shown at 232. The $^1$D peaks are modulated every 5 s ($P_M$=5 s) and the number of modulations is four. Also, the scan step size is set to 0.5 s and the $t_m$ range is set from 0 to 20 s, so the number of possible retention time ($t_m$) is 40 (i.e., p=40). Next, the $^2$D peak areas are calculated. A $^{2D}$ peak area for the first analyte is shown at the bars at 234 and a $^2$D peak area for the second analyte is shown at the bars at 236. Based on the Equations (1)-(5) and (7), the $^1$D peaks are reconstructed and shown as dashed curves. A reconstructed $^1$D peak for the first analyte is shown at 238 and a reconstructed $^1$D peak for the second analyte is shown at 240. A $^1$D chromatogram detected by the primary detector is shown at 242.

FIG. 3C represents the triplet case. A generated peak for a first analyte ($\mu$=5, $\sigma$=1, and $\lambda$=0.5) is shown at 250, a generated peak for a second analyte ($\mu$=7, $\sigma$=2, and $\lambda$=1) is shown at 252, and a generated peak for a third analyte ($\mu$=10, $\sigma$=0.5, and $\lambda$=1) is shown at 254. A calculated $^2$D peak area for the first analyte is shown at the bars at 256, a calculated $^2$D peak area for the second analyte is shown at the bars at 258, and a calculated $^2$D peak area for the third analyte is shown at the bars at 260. A reconstructed $^1$D peak for the first analyte is shown at 262, a reconstructed $^1$D peak for the second analyte is shown at 264, and a reconstructed $^1$D peak for the third analyte is shown at 266. A $^1$D chromatogram detected by the primary detector is shown at 268.

FIGS. 3A-3C demonstrate that the present algorithm is able to reconstruct the $^1$D peaks with high accuracy. In contrast, the traditional method that uses the same EMG model but without the $^1$D chromatogram from the primary detector fails to accurately reconstruct the $^1$D peaks.

Experimental
1. Materials

All the analytes used in the experiment are purchased from Sigma-Aldrich (St. Louis, Mo.) and Fisher Scientific (Pittsburgh, Pa.). They have a purity of greater than 97% and are used as received. Carbopack™ B (60-80 mesh) is purchased from Supelco (Bellefonte, Pa.). A compressed helium gas (99.998%) is purchased from Cryogenic gases (Detroit, Mich.). GC guard columns (250 μm i.d. and 380 μm o.d.), Rtx-5 ms (10 m×250 μm i.d., 0.25 μm coating thickness), RTX-200 (12 m×250 μm i.d., 0.25 μm coating thickness), universal press-tight glass capillary column connectors, and angled Y connectors are purchased from Restek (Belafonte, Pa.). 2-port and 3-port solenoid valves are purchased from Lee Company (Westbrook, Conn.). A diaphragm pump is purchased from Gast Manufacturing (Benton Harbor, Mich.). Nickel wire (0.32 mm diameter, 1.24 Ohms/m) is purchased from Lightning Vapes (Bradenton, Fla.). A type K thermocouple is purchased from Omega Engineering (Stamford, Conn.). A silicon wafer is purchased from University Wafer (Boston, Mass.). The UV lamps and amplifiers for PIDs are purchased from Baseline-Mocon (Lyons, Colo.). A 36V AC/DC converter is purchased from TDK-Lambda Americas Inc. (National City, Calif.). A 24V and a 12V AC/DC converters and axial fans are purchased from Delta Electronics (Taipei, Taiwan). Data acquisition cards (DAQ cards), USB-6212 (16 bits) and USB-TC01 (for thermocouple measurement), are purchased from National Instruments (Austin, Tex.). Customized printed circuit board (PCB) is designed and manufactured by M.A.K.S., Inc. (Troy, Mich.).

2. Fabrication and Characterization of Components 2.1. Fabrication/Characterization of μPI and μTI The μPI and μTI are similar designs. Both include a deep-reactive-ion-etched (DRIE) silicon cavity with tapered inlet/outlet ports, an integrated platinum heater, a temperature sensor, and microfluidic channels. The μPI has a cavity size of 8.15 mm×2.9 mm×0.25 mm, whereas μTI's cavity is slightly smaller (4.1 mm×1.6 mm×0.25 mm). Carbopack™ B granules are loaded into the cavity through a third port using a diaphragm pump, which is sealed with a silicon adhesive after loading. A small segment of guard column is inserted into the inlet and outlet fluidic ports, and secured with an epoxy adhesive. For electrical connection, the heater and resistive temperature detector (RTD) are wire-bonded to a PCB. The RTD on the backside is pre-calibrated in a conventional GC oven with 50, 100, 150, and 200° C. to get the temperature calibration curve (i.e., temperature response versus the resistance). The μPI and μTI are pre-conditioned at 300° C. for 12 hours under helium flow before use.

Figures 4A, 4B:
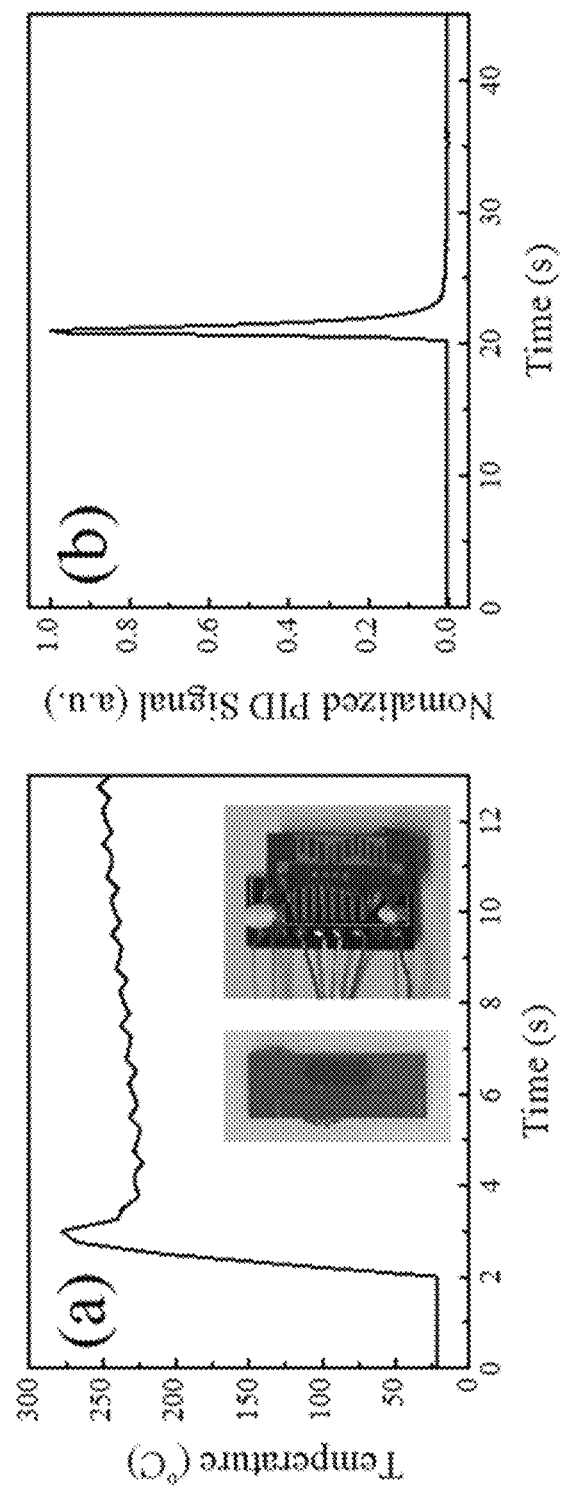

The insets of FIG. 4A show the front and back side of the μPI. The front side photograph clearly shows the well-packed Carbopack™ B in the cavity. The volume of the cavity is 5.9 mm$^3$ and the mass of Carbopack™ B is 1.135 mg. During operation, the μPI is heated by applying 36 VDC for 0.6 s and subsequently 12 VDC for 10 s for complete desorption. To maintain the constant temperature for 10 s by 12 VDC, a pulse-width-modulated signal 4.0-Hz square wave is applied to the heater power relay via USB-6212. FIG. 4A shows that the μPI reached 270° C. in 0.6 s at the ramping rate of 314° C./s and then kept at 250° C. for 10 s. The normalized toluene peak injected under this condition is given in FIG. 4B, showing an FWHM of 700 ms.

2.2. Columns and Temperature Ramping and Reading

The 10 m long RTX-5 ms column for $^1$D (or the 3 m long RTX-200 column for $^2$D) and nickel wire are placed in parallel, wrapped by a TEFLON™ PTFE tape, and then coiled into a helix of 10 cm (or 5 cm for the RTX-200 column) in diameter and 1 cm in height. A type K thermocouple is inserted into the gap between the coiled column to monitor the column temperature in real time via USB-TC01. To achieve a programmed temperature ramping profile, a pulse-width-modulated signal (4.0-Hz square wave) is applied to the heater power relay via USB-6212. The duty cycle of the square wave is calculated by a proportional-integral-derivative controller in the LabView™ program and updated every 0.4 s based on the set and measured temperature.

2.3. Fabrication and Operation of the Micro-Deans Switch (µDS) System

Figures 5A, 5B:
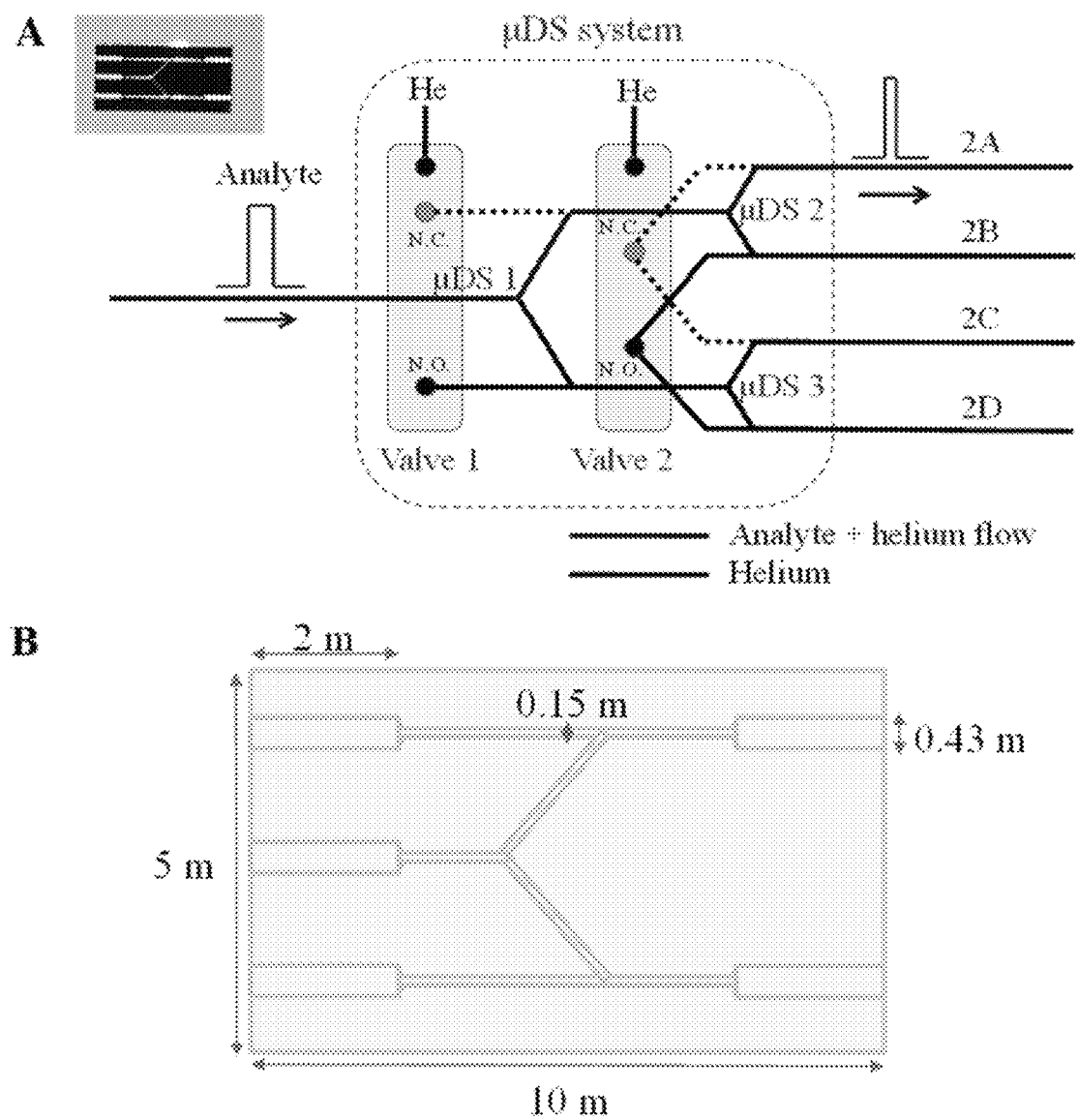
Figures 5C, 5D:
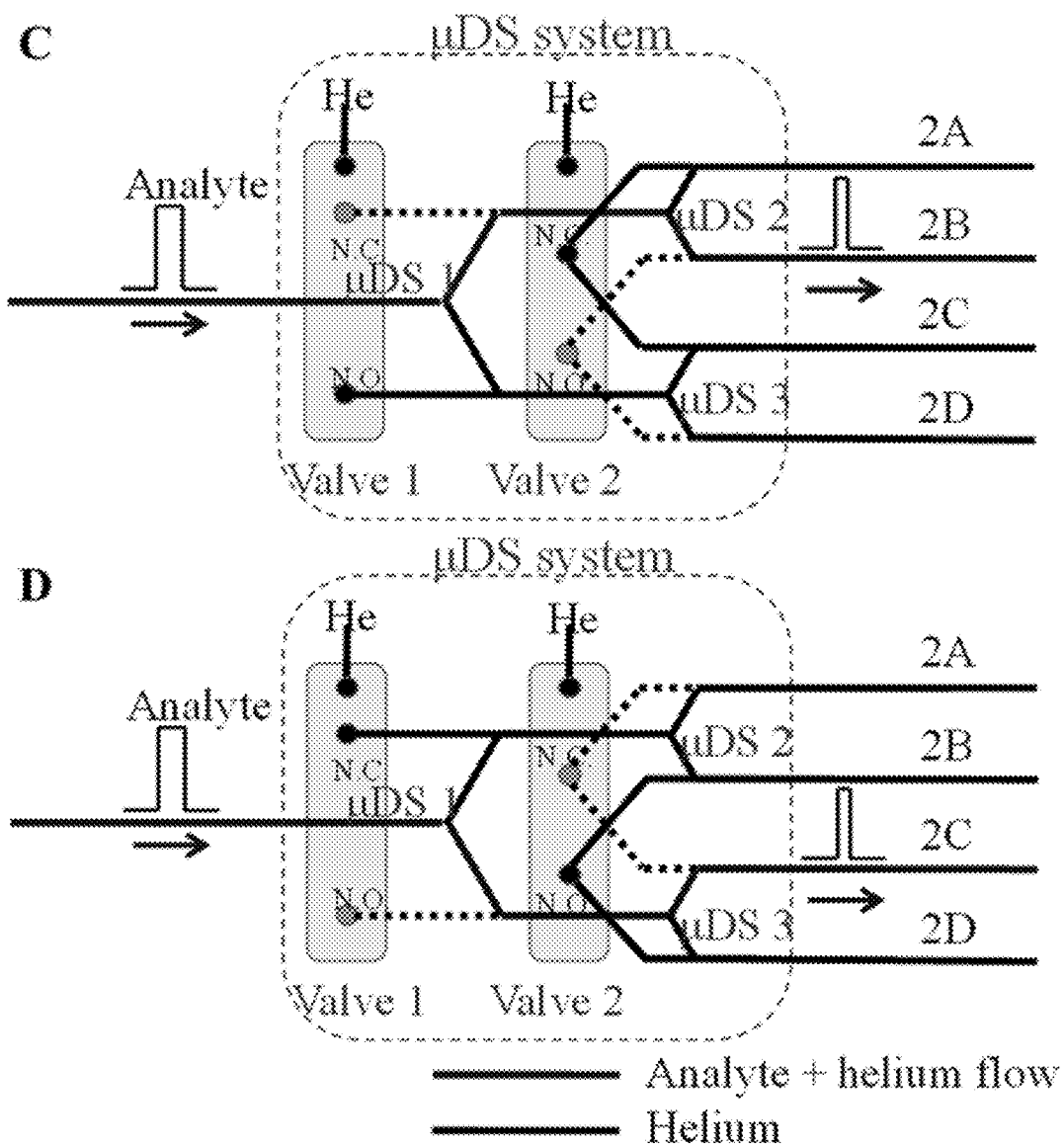

A switching system is used to achieve the routing of eluents from an upstream column to one of the four downstream columns (1×4 switching). It includes three µDSs and two 3-port valves that are connected to a helium source as shown in FIG. 5. The µDS, as shown in the inset of FIG. 5A, had a deep-reactive-ion-etched (DRIE) microfluidic channel (the dimension shown in FIG. 5B) with three inlets (on the left) and two outlets (on the right), an integrated platinum heater, and a temperature sensor. A small segment of guard column is inserted into the inlet and outlet fluidic ports, and secured with an epoxy adhesive. The middle inlet of the µDS is connected to the upstream column, whereas the other two inlets are connected to a 3-port valve (N.O. and N.C. port) for control helium gas to enter. The two outlets of µDS 1 are connected to the middle inlet of µDS 2 and µDS 3, respectively, through the universal connectors. As exemplified in FIG. 5A, in order to route a slice of an eluent from $^1$D to Column 2A in $^2$D, the two 3-port valves are operated in the "close" mode. The details of routing the analytes to other $^2$D secondary chromatographic columns, 2B (e.g., 130B in FIG. 2) and 2C (e.g., 130C in FIG. 2), are given in FIGS. 5C-5D. During the operation, the flow rate is 2 mL/min for all $^2$D channels.

2.4. Fabrication, Assembly, and Calibration of the µPID

The µPID module used in this work is assembled with the Krypton UV lamp, the built-in lamp drive circuit, and the amplifier in a commercial PID from Baseline-Mocon (Lyons, Colo., P/N #043-234), as well as a home-made flow-through ionization chamber. The µPID employs a 2 cm long straight microfluidic channel created by a 380 µm gap between two p-type <100> conductive silicon wafers with a resistivity of 0.001-0.005 Ωcm and a thickness of 380 µm. The bottom and top of the microfluidic channel is covered by a Krypton UV lamp and a glass slide, respectively, which are then glued to the conductive silicon wafers with an optical epoxy. The effective UV illumination length in the channel is about 3.5 mm (i.e., the diameter of the Krypton lamp window). Because the side of the microfluidic channel is made of a conductive silicon wafer, it serves as a signal collection electrode in this configuration. Two copper wires are bonded to the wafers and connected to the amplifier on the commercial PID. The output signal from the amplifier is read by the NI-DAQ (USB-6212). Finally, two guard columns (250 µm i.d. and 380 µm o.d.) are inserted into the inlet and outlet of the µPID and sealed with optical epoxy. Before the analysis, the four µPIDs in $^2$D are calibrated with toluene using µPID 1 as the reference detector. The calibration detail and results are described in J. Lee et al., "In situ calibration of micro-photoionization detectors in a multi-dimensional micro-gas chromatography system," Analyst 141, 4100-4107 (2016), the relevant portions of which are incorporated herein by reference.

3. Assembly and Automation

Figures 6A, 6B:
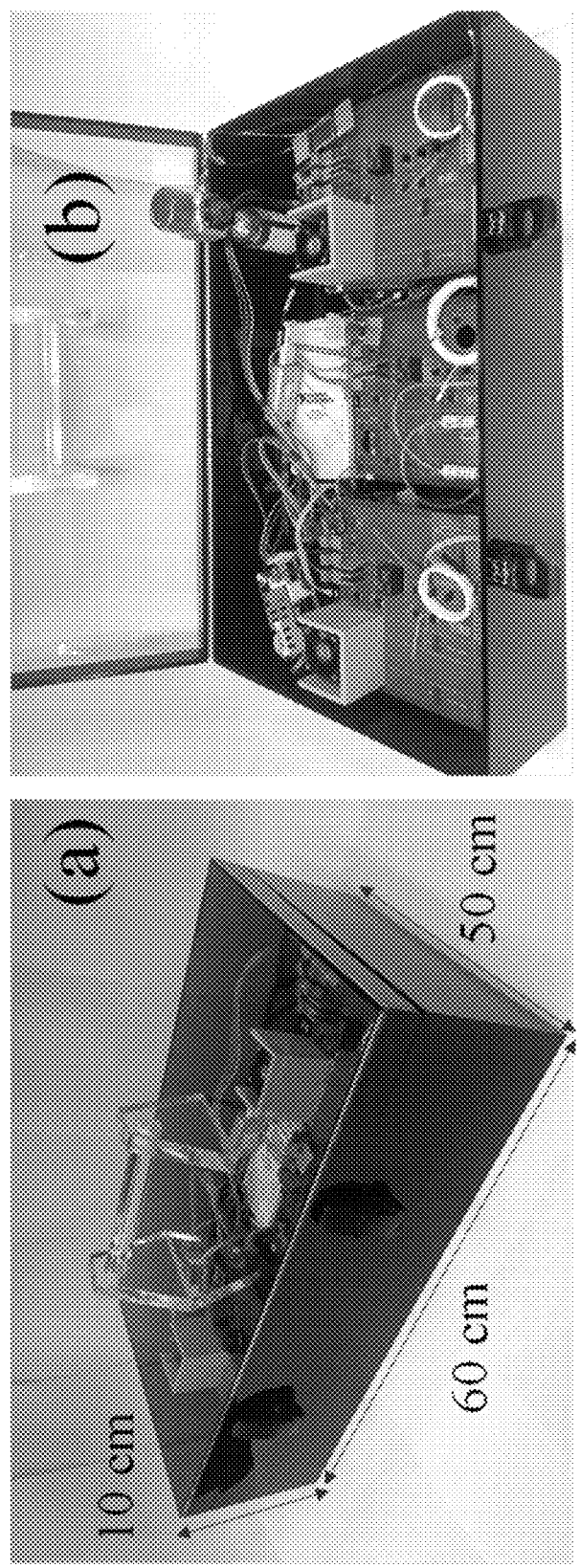

FIGS. 6A-6B show photographs of a portable GC×GC device. The system is housed in a 60 cm (length)×50 cm (width)×10 cm (height) customized plastic case and weighed less than 5 kg. It includes the AC/DC converters, the DAQ cards, the diaphragm pump, and the helium cartridge in the back row, and one $^1$D and four $^2$D separation modules and the µDSs system in the front row. The $^1$D separation module is located in the middle of the front row, and µDSs system is placed under the $^1$D separation module. The $^2$D separation modules of 2A/2B and 2C/2D are stacked with the board spacers and are located to the left and right side of $^1$D separation module, respectively. Below are the detailed operation procedures and parameters related to the experiments discussed herein.

2-D separation of 50 analytes in 14 minutes is demonstrated in a device like that shown in FIGS. 5A-5D, showing the peak capacity of 430-530 and the peak capacity production of 40-80/min. A mixture of 50 analytes of 50 µg $L^{-1}$ concentration placed in the Tedlar bag is drawn by the diaphragm pump through the 2-port valve and adsorbed by Carbopack™ B inside the µPI at a flow rate of 25 mL/min for 2 minutes. After sampling, the 2-port valve is closed and the helium gas is flowed through the 3-port valve for 60 s to stabilize the flow. Finally, the µPI is heated up to 270° C. in 0.6 s and then kept at 250° C. for 10 s for complete thermal desorption.

The analyte undergoes separation through the 10 m long RTX-5 ms column, and then detected by µPID 1. During the separation, the $^1$D column is heated and kept at 50° C. for 1 min, and then ramp at a rate of 5° C. $min^{-1}$ to 120° C. and kept at 120° C. for 4 min. µPID 1 is kept at room temperature (25° C.). The flow rate is 2 mL/min.

A sampling period (or predetermined amount of time) of 8 seconds is used to accumulate a slice of the eluent from the $^1$D column prior to injection into a $^2$D column. The $1^{st}$ 8 s long slice of the eluent from the $^1$D column is routed to and trapped by µTI 2A (132A), which are kept at room temperature (25° C.). Then the µTI is heated to 270° C. in 0.6 s and then kept at 250° C. for 5 s to inject the trapped analytes to Column 2A (130A). Immediately after the injection, the fan on the µTI is turned on to rapidly lower the µTI back to room temperature in 16 s. In the meantime, the $2^{nd}$ 8 s long slice of the eluent from the $^1$D column is routed to and trapped by µTI 2B (132B), which is subsequently injected into Column 2B (132B). The same operation repeated for µTI 2C (132C) and µTI 2D (132D), until the $5^{th}$ 8 s long slice, which is routed to µTI 2A (132A) again. During the entire operation, the helium flow is 2 mL/min for all four $^2$D columns.

The analyte undergoes two dimensional ($^2$D) separation through one of the 3 m long RTX-200 columns (kept at 60° C. during entire operation) and then detected by µPID 2 (kept at room temperature, 25° C.). During the separation, the helium flow rate is 2 mL/min. The maximal separation time for each $^2$D column is 32 s (4 times the sampling period).

Results

1. Reconstruction of $^1$D Peaks

The reconstruction method of $^1$D peaks is validated by injecting the sample into the portable 1×4-channel GC×GC system and comparing the experimental peaks with the reconstructed peaks. First, the reconstruction of a singlet peak is shown. In this case, cyclohexane is injected by the µPI in $^1$D, and underwent the $^1$D separation. After detected by µPID 1, the $^2$D separation for the modulation at 72 s and 80 s is observed. The $^1$D peak is reconstructed according to the procedures above. The singlet result to show the capability of the algorithm. In practice, the $^1$D peak obtained directly from µPID 1 is used, if it is a singlet.

Figures 7A, 7B, 7C, 7D:
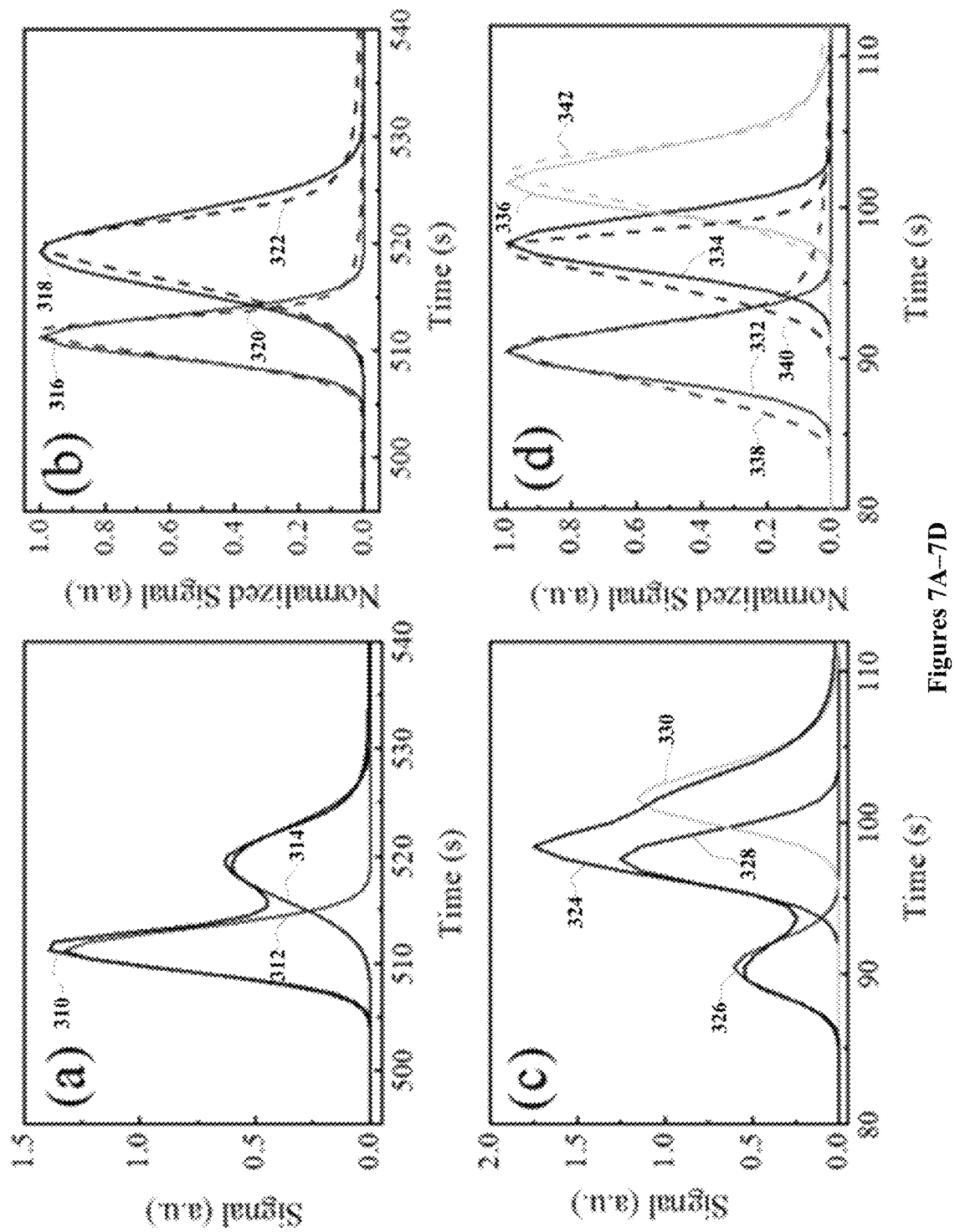
Figures 8A, 8B, 8C, 8D, 8E, 8F:
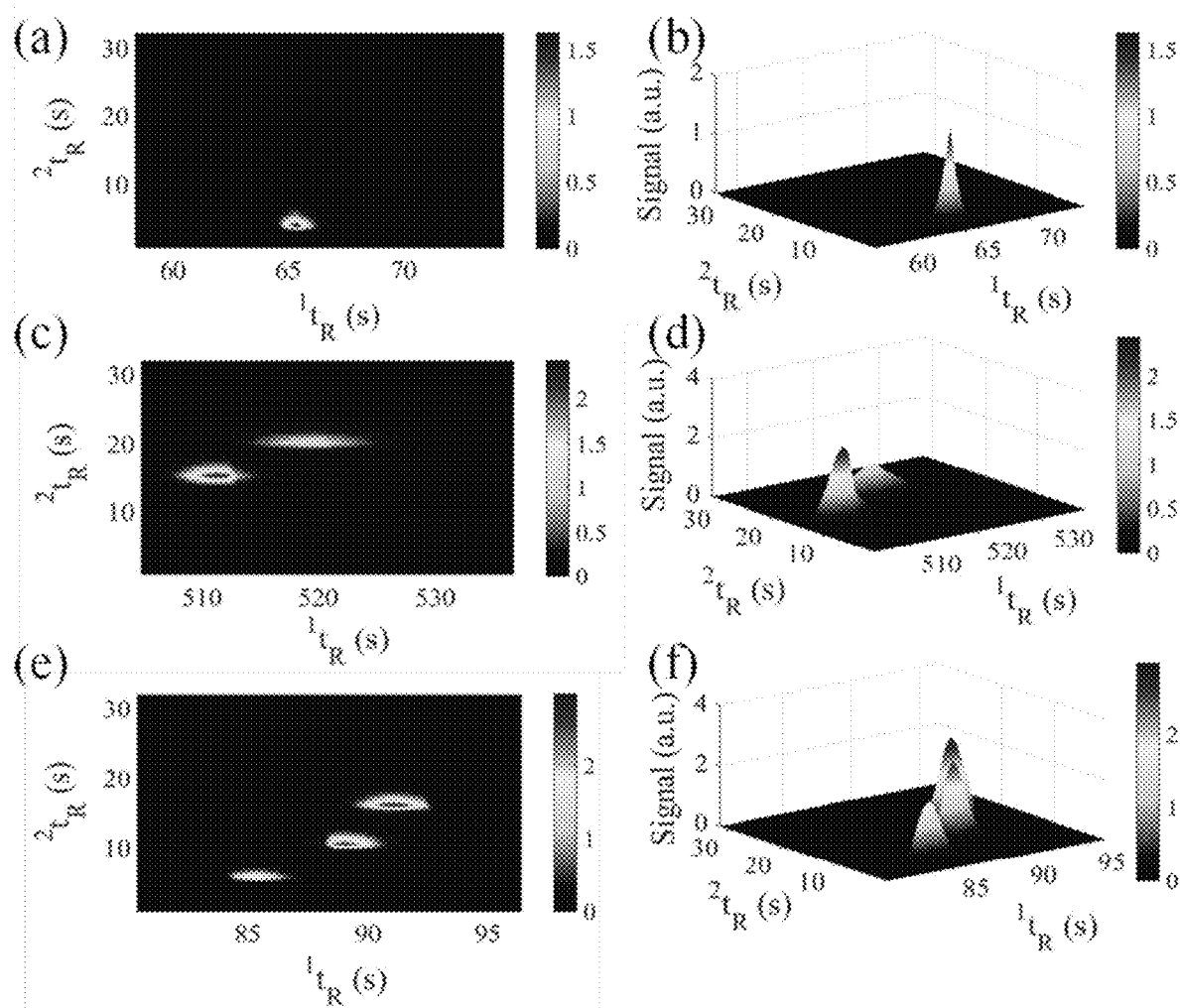
Figure 9:
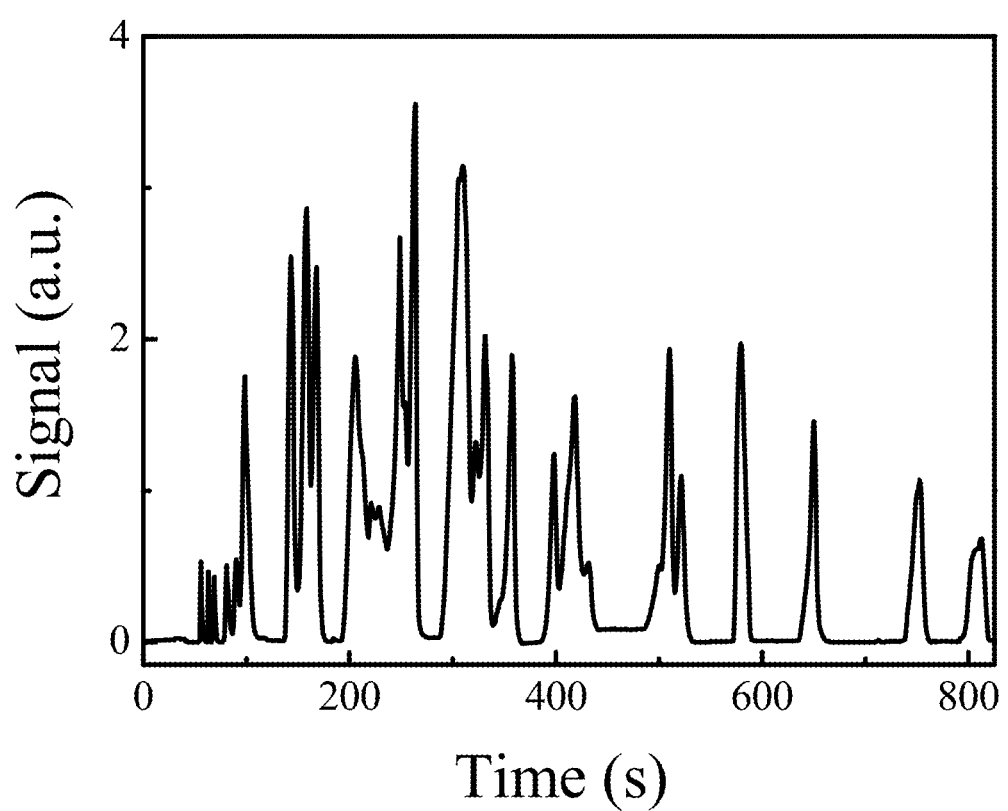
FIG. 9 shows a one-dimensional ($^1$D) chromatogram of 50 volatile organic compounds (VOCs) detected by μPID 1.

Next, a coeluted peak containing two analytes is tested. In this case, 3-chlorotoluene and 1,3-dichlorobenzene are selected due to their similar retention time. The curve 310 in FIG. 7A is detected by μPID 1. The curve 310 shows that the two analytes are not fully separated in $^1$D. This $^1$D peak is then modulated at 512 s, 520 s, 528 s, and 526 s, and further separated in $^2$D and the 2D separation for 512 s, 520 s, 528 s, and 536 s. The $^1$D peaks are reconstructed according to the procedures described above. A reconstructed $^1$D chromatogram for 3-chlorotoluene is shown at 312 and a reconstructed $^1$D chromatogram for 1,3-dichlorobenzene is shown at 314.

Referring to FIG. 7B, to further verify the $^1$D peak reconstruction, each of the two analytes is injected individually into the system prepared in accordance with certain aspects of the present disclosure. The corresponding comparison between the original peaks detected by μPID 1 and those reconstructed is presented FIG. 7B. The reconstructed $^1$D chromatograms for 3-chlorotoluene is shown at 316 and the reconstructed $^1$D chromatograms for 1,3-dichlorobenzene is shown at 318. The curve 320 is obtained with μPID 1 when 3-chlorotoluene is injected individually. The curve 322 is obtained with μPID 1 when 1,3-dichlorobenzene is injected individually. All curves are normalized to their respective peaks for easy comparison.

Finally, the reconstruction is applied to a coeluted peak containing three analytes (heptane, 1,4-dioxane, and methylisobutylketone). An unresolved $^1$D chromatogram detected by μPID 1 is shown at 324 in FIG. 7C. The modulation takes place at 88 s, 96 s, 104 s, and 112 s. The reconstructed peaks are plotted in FIG. 7C. A reconstructed $^1$D chromatogram for heptane is shown at 326. A reconstructed $^1$D chromatogram for 1,4-dioxane is shown at 328. A reconstructed $^1$D chromatogram for methylisobutylketone is shown at 330.

The comparison between the peaks of the analytes injected individually and those reconstructed are presented in FIG. 7D. The reconstructed $^1$D chromatogram for heptane is shown at 332, the reconstructed $^1$D chromatogram for 1,4-dioxane is shown at 334, and the reconstructed $^1$D chromatogram for methylisobutylketone is shown at 336. The curve 338 is obtained with μPID 1 when heptane is injected individually. The curve 340 is obtained with μPID 1 when 1,4-dioxane is injected individually. The curve 342 is obtained with μPID 1 when methylisobutylketone is injected individually. All curves are normalized to their respective peaks for easy comparison. The above examples suggest that the present system and the corresponding algorithm are able to accurately reconstruct $^1$D peaks, thus improving the $^1$D resolution and hence peak capacity.

2. Contour Plot

One of the distinct characteristics of a GC×GC chromatogram is the 2-D contour plot of the well-separated analytes in a mixture. Traditionally, the output of GC×GC is simply a long series of the $^2$D chromatograms, since there is no detector in $^1$D. Thus, the resolution of the traditional 2-D contour plot is lost due to the modulation period and the lack of information on the $^1$D chromatogram. In contrast, in certain variations of the GC×GC according to the present disclosure with the information obtained from the reconstructed $^1$D peaks, the 2-D contour plot can be created with significantly increased resolution. To make such a 2-D contour plot, the $^2$D chromatograms are first deconvoluted for each analyte. For analyte s, its $^1$D chromatogram can be defined as the area-normalized EMG function, $f_s(^1t_R)$, and the $^2$D chromatogram as $$g_s^{(v)}(^2t_R) \cdot v = \left\lfloor \frac{^1t_R}{P_M} \right\rfloor + 1 \ (=1, 2, \ldots, n)$$

represents the $v^{th}$ modulation from $^1$D to $^2$D, where $\lfloor \cdot \rfloor$ is the floor function. Then, the 2-D contour plot of $C_s(^1t_R, {}^2t_R)$ can be obtained as:

$$C_s(^1t_R, {}^2t_R) = f_s(^1t_R) \cdot g_s^{(v)}(^2t_R) \tag{9}$$

Correspondingly, the 2-D contour plot, $C(^1t_R, {}^2t_R)$, of entire N analytes can be written as:

$$C(^1t_R, {}^2t_R) = \sum_{s=1}^{N} C_s(^1t_R, {}^2t_R). \tag{10}$$

FIGS. 8A-8F show the 2-D and the 3-D contour plots for singlet, doublet, and triplet analytes, and FIGS. 8A-8F using the method described in Eqs. (9) and (10), showing well resolved peaks. The 2-D and 3-D contour plots using the traditional method are compared with these contour plots.

3. Demonstration of 2-D Separation of 50 VOCs

Figure 10:
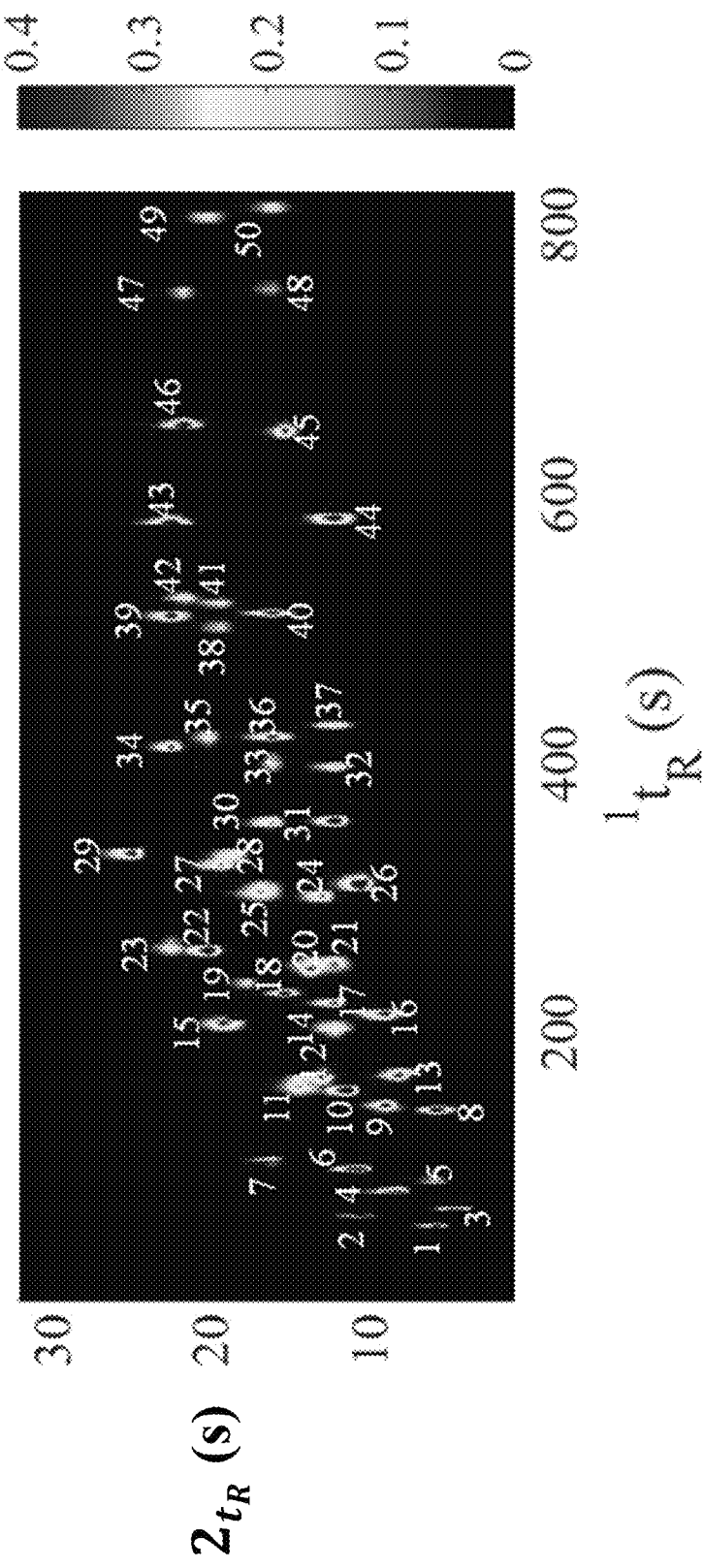
FIG. 10 shows a 2-D contour plot of 50 VOCs generated with the portable 1×4-channel GC×GC device.

A portable 1×4-channel GC×GC device is employed in analyzing a mixture of 50 VOCs (see table in FIG. 11). First, the mixture of 50 VOCs prepared in a Tedlar bag is separated in $^1$D and the corresponding $^1$D chromatogram are recorded by μPID 1 (see FIGS. 8A-8F and 9). With the sampling period of 8 s, the analytes are routed to the $^2$D separation modules and separated in $^2$D. FIG. 10 presents the 2-D contour plot of the 50 VOCs using the 1D reconstruction and contour plot methods discussed herein. It can be seen that the 50 VOCs can be completed separated in only 850 s (or 14.2 minutes). The corresponding reconstructed retention time and peak width in $^1$D, and retention time and peak width in $^2$D are listed in the table in FIG. 11.

Discussion and Conclusion

For GC×GC, its peak capacity is defined as;

$$n_{GC \times GC} = n_1 \times n_2, \tag{11}$$

where $n_1$ and $n_2$ are the peak capacity for $^1$D and $^2$D, respectively.

With the chromatographic resolution Rs of 1, Eq. (11) can be written as:

$$n_{GC \times GC} = 0.35 \cdot (^1t_R/^1\text{FWHM}) \times (CP_M/^2\text{FWHM}) \tag{12}$$

where $^1t_R$ is the analyte retention time in $^1$D. $^1$FWHM and $^2$FWHM are the FWHM in $^1$D and $^2$D, respectively. $P_M$ is the sampling period and C are the number of the $^2$D channels. Correspondingly, the peak capacity production can be written as follows:

$$n_{GC \times GC}/^1t_R = 0.35/^1\text{FWHM} \times (CP_M/^2\text{FWHM}) \tag{13}$$

The 1×4-channel GC×GC performance is evaluated using three exemplary analytes, 2-ethoxyethyl acetate, benzaldehyde, and dodecane. The table in FIG. 12 presents the peak capacity and peak capacity production of 2-ethoxyethyl acetate, benzaldehyde, and dodecane. The peak capacity production ranges from 40/min to 80/min, which is similar to that in a conventional GC×GC. For comparison, the peak capacity and peak capacity production of benzaldehyde, and dodecane in a hybrid μGC×GC system, the peak capacity production is 3 l/min and 14 l/min, respectively, (assuming $^1$FWHM is 17.5 s and 12 s for benzaldehyde and dodecane, respectively).

A fully automated portable 2-dimensional (2-D) gas chromatography (GC×GC) device is thus provided, which has the dimension of 60 cm×50 cm×10 cm and weight less than 5 kg. The device incorporated a micro-preconcentrator/injectors, commercial columns, micro-Deans switches, micro-thermal injectors, micro-photoionization detectors, data acquisition cards, and power supplies, as well as computer control and user interface. It employs multiple channels (4 channels) in the second dimension ($^2$D) to increase the $^2$D separation time (up to 32 s) and hence $^2$D peak capacity. In addition, a non-destructive flow-through vapor detector is optionally installed at the end of the $^1$D column to monitor the eluent from $^1$D and assist in reconstructing $^1$D elution peaks. With the information obtained jointly from the $^1$D and $^2$D detectors, $^1$D elution peaks could be reconstructed with significantly improved $^1$D resolution.

In summary, a fully automated portable 1×4-channel GC×GC device is provided and a method of operating it is contemplated by certain aspects of the present disclosure. The device is compact (60 cm×50 cm×10 cm, and <5 kg), robust (i.e. μTI, and μDS), and rapid (50 VOCs in 14 minutes), and provides excellent peak capacity and peak capacity production. It applies to a plethora of field applications, such as environmental monitoring and protection, workplace safety monitoring, industrial in-line monitoring, food industries, homeland security, battlefield, and biomedicine.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of comprehensive chromatography analysis comprising:
    separating a sample in a primary chromatographic column;
    directing a primary stream exiting the primary chromatographic column toward a non-modulator switching system, wherein the non-modulator switching system comprises at least one micro-switch and at least one valve; and
    continuously operating the non-modulator switching system to selectively direct the primary stream to a plurality of thermal injectors and a plurality of secondary chromatographic columns, wherein each of the plurality of thermal injectors is provided in parallel with one another and is in fluid communication with a respective secondary chromatographic column of the plurality, wherein the continuously operating includes:
    (a) selectively directing a portion of the primary stream to one of the plurality of thermal injectors and accumulating the portion of the primary stream for a predetermined amount of time;
    (b) injecting the portion of the primary stream into one of the plurality of secondary chromatographic columns in fluid communication with the one of the plurality of thermal injectors;
    (c) detecting one or more target analytes in a secondary stream exiting the one of the plurality of secondary chromatographic columns; and
    repeating (a)-(c) to selectively direct other portions of the primary stream to other thermal injectors of the plurality of thermal injectors and the plurality of secondary chromatographic columns in fluid communication therewith until substantially all of the target analytes in the sample are detected after exiting the plurality of secondary chromatographic columns to provide a comprehensive analysis of the sample, wherein a separation time in each secondary chromatographic column of the plurality of secondary chromatographic columns is less than or equal to a product of the predetermined amount of time and a quantity of secondary chromatographic columns in the plurality of secondary chromatographic columns.

2. The method of claim 1, wherein the secondary stream comprises at least one first secondary stream and second secondary stream and the continuously operating further comprises:
    directing a first portion of the primary stream to a first thermal injector of the plurality of thermal injectors and accumulating the first portion of the primary stream for a predetermined amount of time;
    injecting the first portion of the primary stream from the first thermal injector into a first secondary chromatographic column of the plurality of secondary chromatographic columns to create the first secondary stream;
    detecting one or more target analytes in the first secondary stream exiting the first secondary chromatographic column; and
    directing a second portion of the primary stream to a second thermal injector of the plurality of thermal injectors and accumulating the second portion of the primary stream for a predetermined amount of time;
    injecting the second portion of the primary stream from the second thermal injector into a second secondary chromatographic column of the plurality of secondary chromatographic columns to create the second secondary stream; and
    detecting one or more target analytes in the second secondary stream exiting the second secondary chromatographic column.

3. The method of claim 1, further comprising detecting one or more target analytes in the primary stream during or after the separating of the sample in the primary chromatographic column.

4. The method of claim 3, wherein the detecting one or more target analytes in the primary stream includes flowing the sample through a non-destructive on-column detector selected from the group consisting of: a photoionization detector, a capillary based optical ring resonator (CBORR) device, a Fabry-Perot interferometer based sensor, a chemiresistor sensor, a sound acoustic wave sensor, and a thermal conductivity sensor.

5. The method of claim 3, wherein the detecting one or more target analytes in the primary stream generates a first output signal and the detecting one or more target analytes in the secondary stream generates a second output signal, and wherein the method further comprises reconstructing a first dimension elution peak for each analyte based on the first output signal, the second output signal, and the predetermined amount of time.

6. The method of claim 1, wherein the at least one micro-switch of the non-modulator switching system comprises a micro-Deans switch.

7. The method of claim 1, wherein the plurality of secondary chromatographic columns comprises four secondary chromatographic columns.

8. The method of claim 7, wherein the at least one micro-switch comprises a first micro-Deans switch, a second micro-Deans switch, and a third micro-Deans switch, and the at least one valve comprises a first three-port valve and a second three-port valve, wherein a first inlet of the first micro-Deans switch is in fluid communication with the primary stream, a second inlet and a third inlet of the first micro-Deans switch are in fluid communication with the first three-port valve, a first inlet of the second micro-Deans switch is in fluid communication with a first outlet of the first micro-Deans switch, a first inlet of the third micro-Deans switch is in fluid communication with a second outlet of the first micro-Deans switch, a second inlet and a third inlet of the second micro-Deans switch are in fluid communication with the second three-port valve, a second inlet and a third inlet of the third micro-Deans switch are in fluid communication with the second three-port valve, a first outlet of the second micro-Deans switch is in fluid communication with a first secondary chromatographic column, a second outlet of the second micro-Deans switch is in fluid communication with a second secondary chromatographic column, a first outlet of the third micro-Deans switch is in fluid communication with a third secondary chromatographic column, and a second outlet of the third micro-Deans switch is in fluid communication with a fourth secondary chromatographic column.

9. The method of claim 1, wherein the non-modulator switching system and the plurality of thermal injectors are operated at ambient temperature.

10. The method of claim 1, wherein the detecting one or more target analytes in the secondary stream exiting the secondary chromatographic column includes flowing the sample through a non-destructive on-column detector.

11. The method of claim 10, wherein the non-destructive on-column detector is selected from the group consisting of: a photoionization detector, a capillary based optical ring resonator (CBORR) device, a Fabry-Perot interferometer based sensor, a chemi-resistor sensor, a sound acoustic wave sensor, and a thermal conductivity sensor.

12. The method of claim 1, wherein the detecting one or more target analytes in the secondary stream exiting the secondary chromatographic column includes flowing the sample through a destructive on-column detector.

13. The method of claim 12, wherein the destructive on-column detector is selected from the group consisting of: a mass spectrometer (MS), and a flame ionization detector (FID).

14. A method of comprehensive chromatography analysis comprising:
separating a sample in a primary chromatographic column;
directing a primary stream exiting the primary chromatographic column toward a non-modulator switching system, wherein the non-modulator switching system comprises at least one micro-switch and at least one valve; and
continuously operating the non-modulator switching system to selectively direct the primary stream to a plurality of thermal injectors and a plurality of secondary chromatographic columns, wherein each of the plurality of thermal injectors is provided in parallel with one another and is in fluid communication with a respective secondary chromatographic column of the plurality, wherein the continuously operating includes:

(a) selectively directing a portion of the primary stream to one of the plurality of thermal injectors and accumulating the portion of the primary stream for a predetermined amount of time;
(b) injecting the portion of the primary stream into one of the plurality of secondary chromatographic columns in fluid communication with the one of the plurality of thermal injectors;
(c) detecting one or more target analytes in a secondary stream exiting the one of the plurality of secondary chromatographic columns; and
repeating (a)-(c) to selectively direct other portions of the primary stream to other thermal injectors of the plurality of thermal injectors and the plurality of secondary chromatographic columns in fluid communication therewith until substantially all of the target analytes in the sample are detected after exiting the plurality of secondary chromatographic columns to provide a comprehensive analysis of the sample, wherein:
the plurality of secondary chromatographic columns comprises four secondary chromatographic columns; and
the at least one micro-switch comprises a first micro-Deans switch, a second micro-Deans switch, and a third micro-Deans switch, and the at least one valve comprises a first three-port valve and a second three-port valve, wherein a first inlet of the first micro-Deans switch is in fluid communication with the primary stream, a second inlet and a third inlet of the first micro-Deans switch are in fluid communication with the first three-port valve, a first inlet of the second micro-Deans switch is in fluid communication with a first outlet of the first micro-Deans switch, a first inlet of the third micro-Deans switch is in fluid communication with a second outlet of the first micro-Deans switch, a second inlet and a third inlet of the second micro-Deans switch are in fluid communication with the second three-port valve, a second inlet and a third inlet of the third micro-Deans switch are in fluid communication with the second three-port valve, a first outlet of the second micro-Deans switch is in fluid communication with a first secondary chromatographic column, a second outlet of the second micro-Deans switch is in fluid communication with a second secondary chromatographic column, a first outlet of the third micro-Deans switch is in fluid communication with a third secondary chromatographic column, and a second outlet of the third micro-Deans switch is in fluid communication with a fourth secondary chromatographic column.

15. The method of claim 14, wherein the non-modulator switching system and the plurality of thermal injectors are operated at ambient temperature.

16. A method of comprehensive chromatography analysis comprising:
receiving a primary stream of a sample at a non-modulator switching system, wherein the non-modulator switching system comprises at least one micro-switch and at least one valve; and
continuously operating the non-modulator switching system to selectively direct the primary stream to a plurality of thermal injectors and a plurality of chromatographic columns, wherein each of the plurality of thermal injectors is provided in parallel with one another and is in fluid communication with a respective chromatographic column of the plurality, wherein the continuously operating includes:

(a) selectively directing a portion of the primary stream to one of the plurality of thermal injectors and accumulating the portion of the primary stream for a predetermined amount of time;
(b) injecting the portion of the primary stream into one of the plurality of chromatographic columns in fluid communication with the one of the plurality of thermal injectors;
(c) detecting one or more target analytes in a secondary stream exiting the one of the plurality of chromatographic columns; and
repeating (a)-(c) to selectively direct other portions of the primary stream to other thermal injectors of the plurality of thermal injectors and the plurality of chromatographic columns in fluid communication therewith until substantially all of the target analytes in the sample are detected after exiting the plurality of chromatographic columns to provide a comprehensive analysis of the sample, wherein:
the at least one micro-switch of the non-modulator switching system comprises a micro-Deans switch; and
the at least one micro-switch comprises a first micro-Deans switch, a second micro-Deans switch, and a third micro-Deans switch, and the at least one valve comprises a first three-port valve and a second three-port valve, wherein a first inlet of the first micro-Deans switch is in fluid communication with the primary stream, a second inlet and a third inlet of the first micro-Deans switch are in fluid communication with the first three-port valve, a first inlet of the second micro-Deans switch is in fluid communication with a first outlet of the first micro-Deans switch, a first inlet of the third micro-Deans switch is in fluid communication with a second outlet of the first micro-Deans switch, a second inlet and a third inlet of the second micro-Deans switch are in fluid communication with the second three-port valve, a second inlet and a third inlet of the third micro-Deans switch are in fluid communication with the second three-port valve, a first outlet of the second micro-Deans switch is in fluid communication with a first chromatographic column, a second outlet of the second micro-Deans switch is in fluid communication with a second chromatographic column, a first outlet of the third micro-Deans switch is in fluid communication with a third chromatographic column, and a second outlet of the third micro-Deans switch is in fluid communication with a fourth chromatographic column.

17. The method of claim 16, wherein the non-modulator switching system and the plurality of thermal injectors are operated at ambient temperature.

18. The method of claim 16, wherein the detecting one or more target analytes in the secondary stream exiting the secondary chromatographic column includes flowing the sample through a non-destructive on-column detector.

19. The method of claim 18, wherein the non-destructive on-column detector is selected from the group consisting of: a photoionization detector, a capillary based optical ring resonator (CBORR) device, a Fabry-Perot interferometer based sensor, a chemi-resistor sensor, a sound acoustic wave sensor, and a thermal conductivity sensor.

20. The method of claim 16, wherein the detecting one or more target analytes in the secondary stream exiting the secondary chromatographic column includes flowing the sample through a destructive on-column detector, the destructive on-column detector being selected from the group consisting of: a mass spectrometer (MS), and a flame ionization detector (FID).

* * * * *